US008717863B2

(12) United States Patent
Schenk et al.

(10) Patent No.: US 8,717,863 B2
(45) Date of Patent: *May 6, 2014

(54) METHOD AND APPARATUS FOR VECTORED DATA TRANSMISSION

(75) Inventors: Heinrich Schenk, Munich (DE); Axel Clausen, Muenchen (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 462 days.

This patent is subject to a terminal disclaimer.

(21) Appl. No.: 12/912,891

(22) Filed: Oct. 27, 2010

(65) Prior Publication Data

US 2011/0096870 A1  Apr. 28, 2011

Related U.S. Application Data

(60) Provisional application No. 61/255,278, filed on Oct. 27, 2009.

(51) Int. Cl.
*H04J 1/12* (2006.01)
*H04L 12/16* (2006.01)
*H04B 3/20* (2006.01)
*H04L 25/49* (2006.01)

(52) U.S. Cl.
USPC ........... 370/201; 370/268; 370/289; 370/292; 375/296

(58) Field of Classification Search
USPC ......... 370/201, 208, 268, 286–292, 277–278, 370/282; 375/254, 278, 284–285, 296, 375/346–350
See application file for complete search history.

(56) References Cited

U.S. PATENT DOCUMENTS

| | | | | |
|---|---|---|---|---|
| 6,647,067 | B1* | 11/2003 | Hjelm et al. | 375/260 |
| 7,190,665 | B2* | 3/2007 | Warke et al. | 370/201 |
| 7,324,591 | B2* | 1/2008 | Fimoff et al. | 375/233 |
| 7,376,115 | B2* | 5/2008 | Tang et al. | 370/342 |
| 7,843,949 | B2* | 11/2010 | Xu | 370/401 |
| 7,982,669 | B2* | 7/2011 | Nassiri-Toussi et al. | 342/377 |
| 8,045,446 | B2* | 10/2011 | Fang | 370/201 |
| 8,179,774 | B2* | 5/2012 | Schenk et al. | 370/201 |
| 2004/0008760 | A1 | 1/2004 | Dogan | |

(Continued)

FOREIGN PATENT DOCUMENTS

| | | |
|---|---|---|
| EP | 1164758 A2 | 12/2001 |
| EP | 1300969 A1 | 4/2003 |

(Continued)

OTHER PUBLICATIONS

Search report, application No. GB1018021.4. Date of mailing: Feb. 22, 2011. Intellectual Property Office, Newport, South Wales, UK.

(Continued)

*Primary Examiner* — Tri H Phan
(74) *Attorney, Agent, or Firm* — Murphy, Bilak & Homiller, PLLC

(57) ABSTRACT

An apparatus includes a transmitter configured to transmit data via a plurality of communication channels of a communication connection. The transmitter is further configured to transmit a same sequence for vector training on each of the communication channels. The sequences for at least two of the communication channels are shifted with respect to each other.

19 Claims, 13 Drawing Sheets

(56) References Cited

U.S. PATENT DOCUMENTS

| | | |
|---|---|---|
| 2005/0175078 A1 | 8/2005 | Redfern |
| 2005/0237954 A1* | 10/2005 | Hasegawa et al. ............ 370/292 |
| 2006/0274893 A1 | 12/2006 | Cioffi et al. |
| 2007/0189404 A1 | 8/2007 | Baum et al. |
| 2009/0073867 A1 | 3/2009 | Schenk |
| 2009/0175156 A1 | 7/2009 | Xu |
| 2009/0245081 A1* | 10/2009 | Ashikhmin et al. .......... 370/201 |
| 2010/0260284 A1 | 10/2010 | Yoshii et al. |
| 2012/0224685 A1* | 9/2012 | Schenk et al. ........... 379/406.08 |
| 2012/0281738 A1* | 11/2012 | Clausen et al. ............... 375/219 |

FOREIGN PATENT DOCUMENTS

| | | |
|---|---|---|
| EP | 2120412 A1 | 11/2009 |
| WO | 2009/075098 A1 | 6/2009 |
| WO | 2011/009593 A1 | 1/2011 |

OTHER PUBLICATIONS

Lampe et al., Bursty Impulse Noise Detection by Compress Sensing, Apr. 2011, IEEE.

* cited by examiner

FIG 12

| tone-number | 1 | 2 | ... | m | m+1 | m+2 | ... | 2·m | 2·(m+1) | ... | $\frac{n}{m}\cdot(m+1)$ | ... | | n+1 | ... |
|---|---|---|---|---|---|---|---|---|---|---|---|---|---|---|---|
| shifts | 0 | $\frac{n}{m}$ | ... | $\frac{n}{m}\cdot(m-1)$ | 1 | $\frac{n}{m}+1$ | ... | $\frac{n}{m}\cdot(m-1)+1$ | 2 | ... | $\frac{n}{m}-1$ | ... | $2\cdot\frac{n}{m}-1$ | 0 | ... |

↑ no shift    ↑ additional shift    ↑ additional shifts    ↑ no shift sub-group #1 | sub-group #2 | sub-group #3 main-group #1

METHOD AND APPARATUS FOR VECTORED DATA TRANSMISSION

PRIORITY CLAIM

This application claims priority benefit under 35 U.S.C. §119(e) from U.S. Provisional Application No. 61/255,278, filed 27 Oct. 2009, said provisional application incorporated herein by reference in its entirety.

BACKGROUND

So-called vectoring or vectored data transmission is a technique for coordinated transmission or reception of data from a plurality of transmitters to a plurality of receivers via a plurality of communication connections in order to improve the transmission, for example to reduce the influence of crosstalk. Either transmitters or receivers are co-located.

For example, in DSL (digital subscriber line) transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of the received signals is sometimes referred to as crosstalk cancellation. The communication connections which are processed jointly are sometimes referred to as vectored group.

Both at the initialization of communication and during communication, it may be necessary to add an additional communication connection to the vectored group, for example when an additional user of a DSL service becomes active. In such a case, it is desirable to determine the crosstalk coupling between the communication connection to be added to the vectored group and the communication connections in the vectored group. To this end, usually predefined sequences, for example sequences of pilot signals or training signals are transmitted via the communication connections, and the received signals are compared to the sent signals to determine an error signal. The crosstalk coupling between the communication connections are then determined based on these errors.

For very large systems comprising many communication connections, this determination is computationally complex, i.e., requires many individual calculation operations, and may take a considerable amount of time, as long sequences may have to be used for training.

Furthermore, in some situations the crosstalk couplings between communication connections may suddenly change, such that for example one communication connection of a vectored group suddenly significantly disturbs other communication connections of the vectored group and/or is disturbed by other communication connections of the vectored group. Such changes of the crosstalk coupling between two or more of the communication connections of a vectored group may for example be caused by failure of components of communication devices involved, loose connections or the like.

SUMMARY

In an embodiment, an apparatus is provided, comprising a transmitter configured to transmit data via a plurality of communication channels of a communication connection. The transmitter is further configured to transmit a same sequence for vector training on each of the communication channels, and the sequences for at least two of the communication channels are shifted with respect to each other.

According to another embodiment, an apparatus is provided, comprising a vectoring device configured to reduce crosstalk between a plurality of communication connections. The vectoring device is configured to determine crosstalk coupling between the communication connections, each communication connection comprising a plurality of communication channels. The vectoring device is further configured to adapt the vectoring based on a plurality of error values, each error value being indicative of a difference between a transmitted pilot signal and a received pilot signal, the pilot signals being parts of a sequence of pilot signals. The error values are derived from different communication channels and comprise one error value for each element of the sequence.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings:

FIG. 12 shows a diagram for explaining some features of some embodiments, FIG. 13 shows a further diagram for explaining some features of some embodiments.

DETAILED DESCRIPTION OF THE INVENTION

Figure 1:
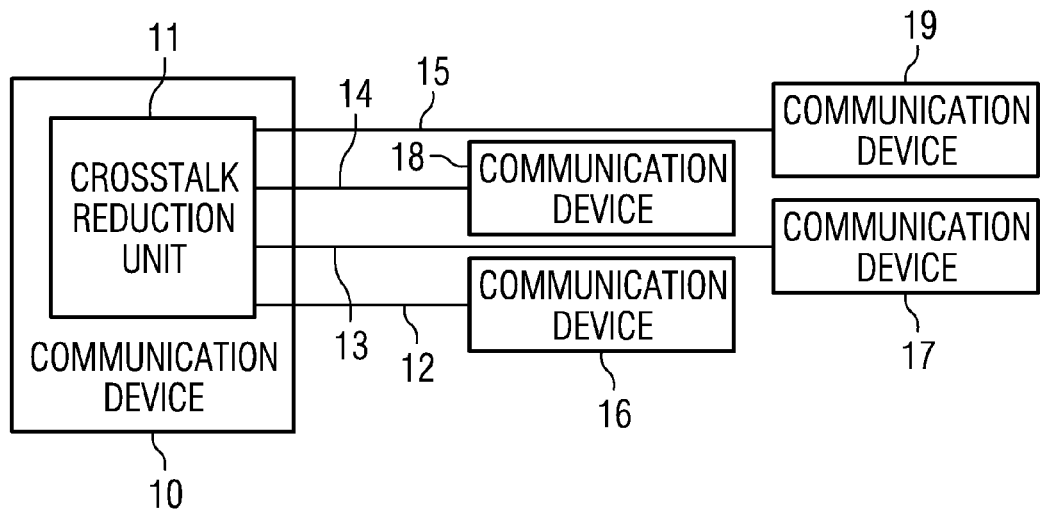
FIG. 1 shows a communication system according to an embodiment.

It is to be understood that the following description is given only for the purpose of illustration and is not to be taken in a limiting sense. The scope of the invention is not intended to be limited by the embodiments described hereinafter with reference to the accompanying drawings, but is to be intended only to be limited by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling. Furthermore, it should appreciated that functional blocks or units shown in the drawings may be implemented as separate circuits in embodiments, but may also be fully or partially implemented in a common circuit in other embodiments. It is further to be understood that any connection which is described as being wire-based in the following specification may also be implemented as a wireless communication unless noted to the contrary.

It should be noted that the drawings are provided to give an illustration of some aspects of embodiments and therefore are to be regarded as schematic only. In particular, the elements shown in the drawings are not necessary to scale with each other, and the placement of various elements in the drawings is chosen to provide a clear understanding of the respective embodiment and is not to be construed as necessarily being a representation of the actual relative locations of the various components.

The features of the various embodiments described herein may be combined with each other unless specifically noted otherwise.

The term "communication connection" as used herein is intended to refer to any kind of communication connection including wire-based communication connections and wireless communication connections.

FIG. 1 illustrates an embodiment of a communication system including a communication device 10 that communicates with communication devices 16, 17, 18 and 19 via respective communication connections 12, 13, 14 and 15. While in FIG. 1 four communication devices 16, 17, 18 and 19 are shown, in other embodiments any suitable other number of communication devices may also be provided.

In an embodiment, the communication via communication connections 12, 13, 14 and 15 is a bidirectional communication. In such an embodiment, communication device 10 may comprise a transceiver for each of the communication connections 12, 13, 14 and 15, and each communication device 16, 17, 18 and 19 also may comprise a transceiver. In another embodiment, all or some of communication connections 12, 13, 14 and 15 may be unidirectional communication connections. In another embodiment, all or some of the communication devices 16, 17, 18, 19 might be co-located.

In the embodiment of FIG. 1, couplings between the communication connections 12-15 may cause crosstalk, for example if some or all of the communication connections are wire lines running close to each other. Through at least partial joint processing of the signals transmitted from communication device 10 to communication device 16, 17, 18 and 19 and through at least partial joint processing of signals received from communication devices 16, 17, 18 and 19 at communication device 10 in a crosstalk reduction unit 11, the influence of such crosstalk may be reduced. As already mentioned, the joint processing for crosstalk reduction is also referred to as vectoring, and the communication connections which are subjected to such a crosstalk reduction are also referred to as vectored group.

In the following, the transmission direction from communication device 10 to communication devices 16, 17, 18 and 19 will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e., before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In embodiments, crosstalk cancellation may for example be performed by calculating received signals for each communication connection depending on a linear combination of all received signals on all communication connections of the vectored group, and crosstalk precompensation may be performed by calculating signals to be transmitted via each communication connection depending on a linear combination of signals to be transmitted on all communication connections. However, other calculation methods, for example non-linear calculations, are also possible.

In order to perform this crosstalk reduction, i.e., the vectoring, the crosstalk reduction unit 11 has to be "trained", i.e., the crosstalk reduction unit 11 needs information regarding the actual crosstalk occurring between the communication connections in the vectored group for example in the form of coupling coefficients. This may for example be achieved by transmitting predetermined pilot signals for performing the training, which may also referred to as training signals, via the communication connections and analyzing the received signals to determine the crosstalk. It should be noted that these pilot signals may not only be transmitted during dedicated training phases, but also during regular data transmission. In this respect, the terms training and adapting are used synonymously herein and may be used to refer to a training for initialization purposes, for example when a communication connection joins a vectored group, a training during data transmission to account, e.g., for changes in crosstalk or both. In embodiments, data transmission via the communication connections comprises the transmission of pilot signals or symbols, wherein between the pilot signals other data like payload data may be transmitted. In an embodiment, the pilot signals or modified pilot signals are used for training crosstalk reduction unit 11. In an embodiment, synchronization signals or synchronization symbols may be used as pilot signals.

In a communication system like the one shown in FIG. 1, the situation may occur that a communication connection is to be added to the vectored group. For example, in the embodiment of FIG. 1 initially only communication connections 12, 13 and 14 may be included in the vectored group, while communication connection 15 may be inactive (for example communication device 19 may be switched off) and therefore not be added to the vectored group. When communication device 19 becomes active, in order to also reduce the crosstalk between communication connection 15 and communication connections 12-14 which already are incorporated in the vectored group, communication connection 15 is to be added to the vectored group. For such an additional communication connection to be added, crosstalk reduction unit 11 has to be trained and adapted accordingly.

In an embodiment, for adding an additional communication connection (like communication connection 15 in the above example) to a vectored group, a first vector training is performed to reduce or cancel the crosstalk resulting from the influence of the communication connection to be added, hereinafter also referred to as the joining connection, to the communication connections already in the vectored group. When this first vector training is completed, the influence of data transmitted over the joining connection on the data transmission of the connections already in the vectored group is minimized or at least reduced by an adaptation of the crosstalk reduction coefficients of the connections already in the vectored group in crosstalk reduction unit 11 of the embodiment of FIG. 1.

Some time but not necessarily immediately after this first vector training, in the currently discussed embodiment a second vector training is performed to adapt the vectoring to reduce or cancel crosstalk resulting from the influence of the communication connections of the vectored group to the joining communication connection.

In one embodiment, which may be combined with the aforementioned embodiments, but also used separately, the vector training is generally performed using modified non-payload data carrying signals like pilot symbols or pilot signals as mentioned above. For example, synchronization symbols used in a standardized communication method like VDSL to synchronize super frames may be multiplied with sequences of +1 and −1, the sequences of the different channels being chosen such that they are orthogonal to form pilot symbols. For example, Walsh-Hadamard sequences may be used as the modulation sequence.

In some embodiments, when the above-mentioned pilot signals are received via the communication connections, an error is determined representing a difference between the sent communication signals (which are known) and the received communication signals. Based on this error, the crosstalk coupling coefficients, in the following also referred to as FEXT coupling coefficients, can be determined.

Figure 2:
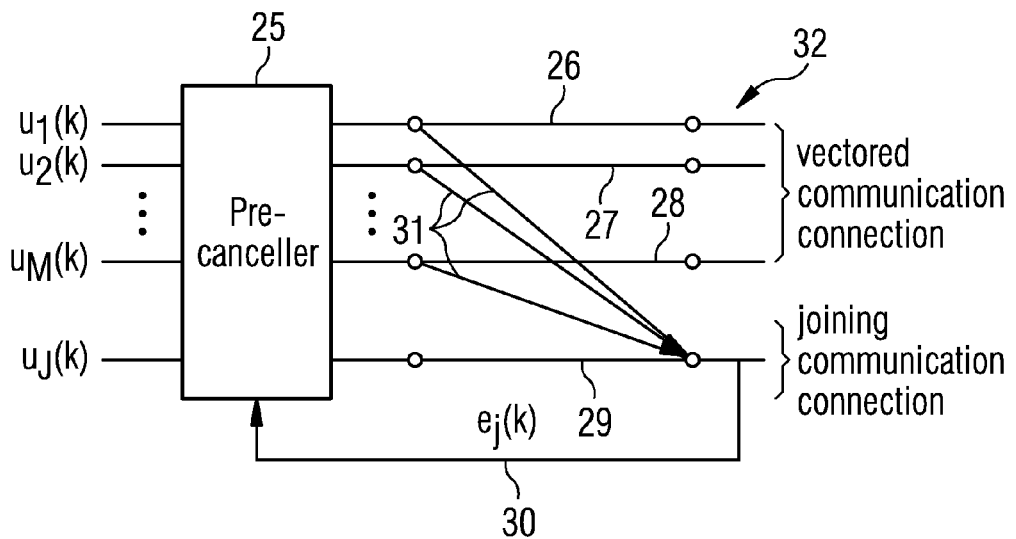
FIG. 2 shows portions of a communication system according to an embodiment.

This will be explained further with respect to FIG. 2, which shows a communication system according to an embodiment which is active in the downstream direction. FIG. 2 shows the situation during the above-mentioned second vector training, i.e., a training phase where the crosstalk from the communication connection already in the vectored group to the joining communication connection, i.e., the communication connection to be added to the vectored group, is reduced through crosstalk precancellation. In particular, FIG. 2 schematically shows the second vector training in the downstream direction.

In FIG. 2, communication connections 26-29 are shown, wherein communication connections 26-28 are already in the vectored group and communication connection 29 is a joining communication connection, i.e., is to be added to the vectored group. In the second vector training phase, crosstalk from communication connections 26-28 to joining communication connection 29 is to be cancelled, said crosstalk being indicated by arrows 31 in FIG. 2. To adapt a precanceller 25, pilot signals $u_1(k)$ to $u_M(k)$ and $u_j(k)$ are transmitted from an upstream end where precanceller 25 is located, e.g., a central office, to a downstream end 32 of communication connections 26-29.

While three communication connections 26-28 are shown in the vectored group, they represent any arbitrary number of connections, which also may mean only a single connection, but on the other hand may also mean some ten or even some hundred connections. Generally, the number of communication connections already in the vectored group will be designated with M in the following.

The index of $u_1(k)$ to $u_M(k)$ designates the number of the vectored communication connection on which the respective pilot signal is sent and runs from 1 to M. The index j indicates the pilot signals sent on the joining communication connection. k represents a time index, i.e., first $u_n(1)$ is sent, then $u_n(2)$ is sent etc. n in this respect is selected from 1 to M and j and designates, as explained above, the communication connection.

At a downstream end of the joining communication connection 29, an error signal $e_j(k)$ is calculated which indicates a difference, e.g., a sign of a difference and/or a magnitude of a difference, between the sent pilot signal $u_j(k)$ and the correspondingly received signal at the downstream end. This error signal $e_j(k)$ is then sent back to precanceller 25, for example via a backchannel on communication connection 29, and is used to adapt the vectoring of precanceller 25 to reduce the crosstalk indicated by arrows 31.

To achieve this, in an embodiment crosstalk coupling coefficients between the vectored communication connections and the joining communication connections are estimated. The crosstalk coupling coefficient between the n-th vectored communication connection, n ranging from 1-M, and the joining communication connection will be labeled $FEXT_{n \to j}$ in the following. Therefore, in such an embodiment M coefficients have to be estimated. Correspondingly, M error values $e_j$ are needed which in an embodiment are determined by transmitting a sequence of pilot signals on each of the communication signals which has a length of at least M sequence elements.

The relationship between M consecutive error values $e_j$, corresponding pilot signals and the FEXT coupling coefficients can be expressed as follows:

$$\begin{bmatrix} e_j(k) \\ e_j(k+1) \\ \vdots \\ e_j(k+M-1) \end{bmatrix} = \begin{bmatrix} u_1(k) & u_2(k) & \ldots & u_M(k) \\ u_1(k+1) & u_2(k+1) & \ldots & u_M(k+1) \\ \vdots & \vdots & \ddots & \vdots \\ u_1(k+M-1) & u_2(k+M-1) & \ldots & u_M(k+M-1) \end{bmatrix} \cdot \begin{bmatrix} FEXT_{1 \to j} \\ FEXT_{2 \to j} \\ \vdots \\ FEXT_{M \to j} \end{bmatrix} \quad (1)$$

The above equation (1) is essentially exact if no additive noise is present in the system. With the presence of noise, the above equation (1) is an approximation and may serve to approximately determine, i.e., estimate, the FEXT coefficients $FEXT_{n \to j}$; n=1 . . . M.

The above equation, for simplicity of notation, may be written in vector form:

$$e_j = U \cdot FEXT \quad (2)$$

wherein $e_j$ vector of equation (1) comprising the error values, U is the matrix comprising the signal values u and FEXT is the vector comprising the values $FEXT_{n \to j}$.

By choosing the pilot signals such that U is not a singular quadratic matrix, the vector FEXT can then be estimated by $$FEXT = [U]^{-1} \cdot e_j \quad (3)$$

wherein $[\ ]^{-1}$ denotes the matrix inversion operation.

In the above equations, it can be seen that sequences of pilot signals u of a length M are used. It should be noted that also a length exceeding M may be used, wherein the values exceeding M may be ignored or be accommodated by using additional "virtual" lines with FEXT coupling coefficients of zero.

In an embodiment, the sequences of pilot signals for different communication connections are orthogonal to each other. This may for example be achieved by multiplying a fixed signal value, for example a fixed signal constellation, with orthogonal sequences of +1 and −1 to obtain the actually transmitted sequences. As an example, so-called Walsh-Hadamard sequences may be used as orthogonal sequences of +1 and −1.

A Walsh-Hadamard matrix of size 2n $W_{2n}$, n being an integer equal to or greater than one, is defined as $$W_{2n} = \begin{bmatrix} W_n & W_n \\ W_n & -W_n \end{bmatrix} \quad (4)$$

wherein, to obtain a sequence of 1 and −1 as described above, for example $$W_1 = [1] \quad (5)$$

may be used. Starting with equation (5), Walsh-Hadamard matrixes of any desired size 2n may then be calculated recursively. For example $$W_2 = \begin{bmatrix} 1 & 1 \\ 1 & -1 \end{bmatrix} \quad (6)$$

$$W_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (7)$$

The values of one row may then be used in the above-described manner to determine an orthogonal sequence for a specific communication connection. For example, in a system with all together four lines, based on equation (7) the first row, i.e., 1, 1, 1, 1, may be used as a sequence for the first communication connection, the second row, i.e., 1, −1, 1, −1, may be used as a sequence for the second communication connection, the third row, i.e., 1, 1, −1, −1, may be used for the third communication connection and the fourth row, i.e., 1, −1, −1, 1, may be used for the fourth communication connection.

The Walsh-Hadamard matrix is symmetric and orthogonal, which means that $W_n \cdot W_n$ is a diagonal matrix with n as diagonal elements.

When sequences of length n based on a Walsh-Hadamard matrix $W_n$, and if as pilot signals fixed, for example fixed complex, data symbols $u_0$ are used, equation (3) may be rewritten as $$FEXT = \frac{1}{u_0} [W_n]^{-1} \cdot e_j \quad (8)$$

Using the above-described properties of the Walsh-Hadamard matrix (orthogonality and symmetry) equation (8) may also be written as $$FEXT = \frac{1}{u_0} \left( \frac{1}{n} \cdot W_n \right) \cdot e_j \quad (9)$$

As mentioned above, the length of the orthogonal sequence, i.e., n, in the currently discussed embodiments is greater or equal to the number of lines M involved.

As $u_0$, which for example may be set to the complex value of 1+j, j being the imaginary unit, is simply a constant, it will be omitted in the following explanations for simplicity of notation.

For large values of n, equation (9) requires a correspondingly large number of multiplication and addition operations for multiplying the matrix $W_n$ with the vector $e_j$. In the following, some embodiments will be described where the number of such computing operations is reduced. Such an embodiment will be described with reference to FIG. 3.

Figure 3:
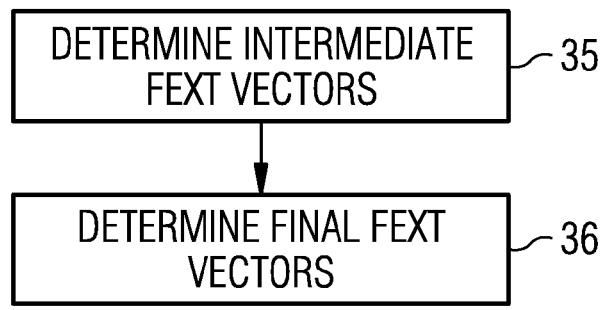
FIG. 3 shows a flow diagram of a method according to an embodiment.

Instead of directly determining the vector FEXT, i.e., the FEXT coupling coefficients, at 35 intermediate FEXT vectors are calculated. The intermediate FEXT vectors in an embodiment have a number of components less than the number of FEXT coefficients to be determined, the components of the intermediate FEXT vectors being linear combinations of components of the vector FEXT. At 36 the final FEXT vector FEXT comprising the FEXT coupling coefficients is then determined based on the intermediate FEXT vectors. An example for this procedure will be given in the following, wherein it should be noted that the embodiment of FIG. 3 is not limited to the examples given below, but the examples are merely given to illustrate the embodiment of FIG. 3 further.

In the following example, it is assumed that n=M, i.e., the Walsh-Hadamard matrix size corresponds to the number of active lines. As mentioned above, the case of n>M may simply be treated by introducing virtual lines in an embodiment. In an embodiment, n may be a power of 2, for example $2^p$, p being a positive integer.

As an example, two intermediate FEXT vectors $F_1$, $F_2$ as follows may be used:

$$F_1 = \begin{bmatrix} FEXT_{1 \to j} + FEXT_{\frac{n}{2}+1 \to j} \\ FEXT_{2 \to j} + FEXT_{\frac{n}{2}+2 \to j} \\ \vdots \\ FEXT_{\frac{n}{2} \to j} + FEXT_{n \to j} \end{bmatrix} \quad (10)$$

$$F_2 = \begin{bmatrix} FEXT_{1 \to j} - FEXT_{\frac{n}{2}+1 \to j} \\ FEXT_{2 \to j} - FEXT_{\frac{n}{2}+2 \to j} \\ \vdots \\ FEXT_{\frac{n}{2} \to j} - FEXT_{n \to j} \end{bmatrix} \quad (11)$$

As can be seen, the intermediate vector $F_1$ has as components sums of the components of the vector FEXT, and the vector $F_2$ differences of components of FEXT as components. The length of each of the two intermediate vectors $F_1$, $F_2$, i.e., the number of components, is half the number of components of the vector FEXT.

After determining the error values, i.e., the error value $e_j$, as described above, $F_1$ and $F_2$ may be determined according to:

$$F_1 = \left(\frac{2}{n} \cdot W_{\frac{n}{2}}\right) \cdot \begin{bmatrix} e_j(k) \\ e_j(k+1) \\ e_j\left(k+\frac{n}{2}-1\right) \end{bmatrix} = \left(\frac{2}{n} \cdot W_{\frac{n}{2}}\right) \cdot e_1 \quad (12)$$

$$F_2 = \left(\frac{2}{n} \cdot W_{\frac{n}{2}}\right) \cdot \begin{bmatrix} e_j\left(k+\frac{n}{2}\right) \\ e_j\left(k+\frac{n}{2}+1\right) \\ e_j(k+n-1) \end{bmatrix} = \left(\frac{2}{n} \cdot W_{\frac{n}{2}}\right) \cdot e_2 \quad (13)$$

In the above equations (12) and (13), $e_1$ represents the first half, i.e., the first n/2 components of the vector $e_j$, and $e_2$ represents the second half of components. As can be seen from equations (12) and (13), only the matrix $W_n/2$, i.e., the first quarter of the original (n·n) Walsh-Hadamard matrix is used (see equation (4)).

The FEXT coupling coefficients FEXT may then be determined according to $$\begin{bmatrix} FEXT_{1 \to j} \\ FEXT_{2 \to j} \\ \vdots \\ FEXT_{\frac{n}{2} \to j} \end{bmatrix} = \frac{1}{2} \cdot (F_1 + F_2) = \frac{1}{n} \cdot W_{\frac{n}{2}} \cdot (e_1 + e_2) \quad (14)$$

$$\begin{bmatrix} FEXT_{\frac{n}{2}+1 \to j} \\ FEXT_{\frac{n}{2}+2 \to j} \\ \vdots \\ FEXT_{n \to j} \end{bmatrix} = \frac{1}{2} \cdot (F_1 - F_2) = \frac{1}{n} \cdot W_{\frac{n}{2}} \cdot (e_1 - e_2), \quad (15)$$

wherein with equation (14) the first half of the components of the vector FEXT are determined and with equation (15) the second half of the components are determined. By using the calculation according to equations (12)-(15), the number of arithmetic operations may be reduced compared to equation (9).

It should be noted that the usage of two intermediate vectors $F_1$ and $F_2$ is only an example. In other embodiments, generally m intermediate vectors can be used, wherein m may be a power of 2, i.e., $m=2^x$ with x being an integer number, and m<n (n being the size of the Walsh-Hadamard matrix which may be equal to or greater than M, i.e., the number of lines in the vectored group, as explained above).

Each of such m intermediate vectors may be determined by using m of the total n error value described above, i.e., $F_1$ may be determined by using the first n/m error values, $F_2$ may be determined by using the second n/m error values, etc, according to:

$$F_1 = \frac{m}{n} \cdot W_{\frac{n}{m}} \cdot e_{j,1} \quad (16)$$

$$F_2 = \frac{m}{n} \cdot W_{\frac{n}{m}} \cdot e_{j,2} \quad (17)$$

$$\vdots$$

$$F_m = \frac{m}{n} \cdot W_{\frac{n}{m}} \cdot e_{j,m} \quad (18)$$

In equations (16)-(18), $e_{j,1}$ contains the first n/m values of the vector $e_j$, $e_{j,2}$ contains the second n/m values of the vector $e_j$; etc. until $e_{j,m}$ contains the last n/m values of the vector $e_j$.

As can be seen, for the above calculations only a Walsh-Hadamard matrix of size (n/m)·(n/m) needs to be used instead of the full n·n Walsh-Hadamard matrix.

The values of the vector FEXT may then again be calculated by linear combinations of the intermediate vectors, in the above example according to:

$$\begin{bmatrix} FEXT_{1 \to j} \\ FEXT_{2 \to j} \\ \vdots \\ FEXT_{\frac{n}{m} \to j} \end{bmatrix} = \frac{1}{m}(F_1 + F_2 + \ldots + F_m) \quad (19)$$

$$\begin{bmatrix} FEXT_{\frac{n}{m}+1 \to j} \\ FEXT_{\frac{n}{m}+2 \to j} \\ \vdots \\ FEXT_{2\frac{n}{m} \to j} \end{bmatrix} = \frac{1}{m}(F_1 - F_2 + \ldots - F_m) \quad (20)$$

The signs in the linear combinations of the intermediate vectors F in equations (19) and (20) in this embodiment are given according to the signs in the rows (or columns) of a Walsh-Hadamard matrix $W_m$. For example, if m=4, according to equation (7) for determining the first n/4 components of the vector FEXT only + would be used as sign, for the second n/m component +, −, +, − would be used as signs, for the third n/m component +, +, −, − would be used as signs, and for the fourth n/4 components +, −, −, + would be used as signs.

It should be noted that the above calculations only serve as an example. For example, while Walsh-Hadamard matrixes may be used for determining orthogonal sequences and also for determining the signs of the linear combinations of the intermediate vectors as explained above, other orthogonal or non-orthogonal sequences of pilot signals may be used, and the signs may then be adapted accordingly.

The vectors F may be determined sequentially in an embodiment according to the availability of the respective components of $e_j$ which, as can be seen from equation (1), become available one after the other. This is schematically shown in FIG. 4.

Figure 4:
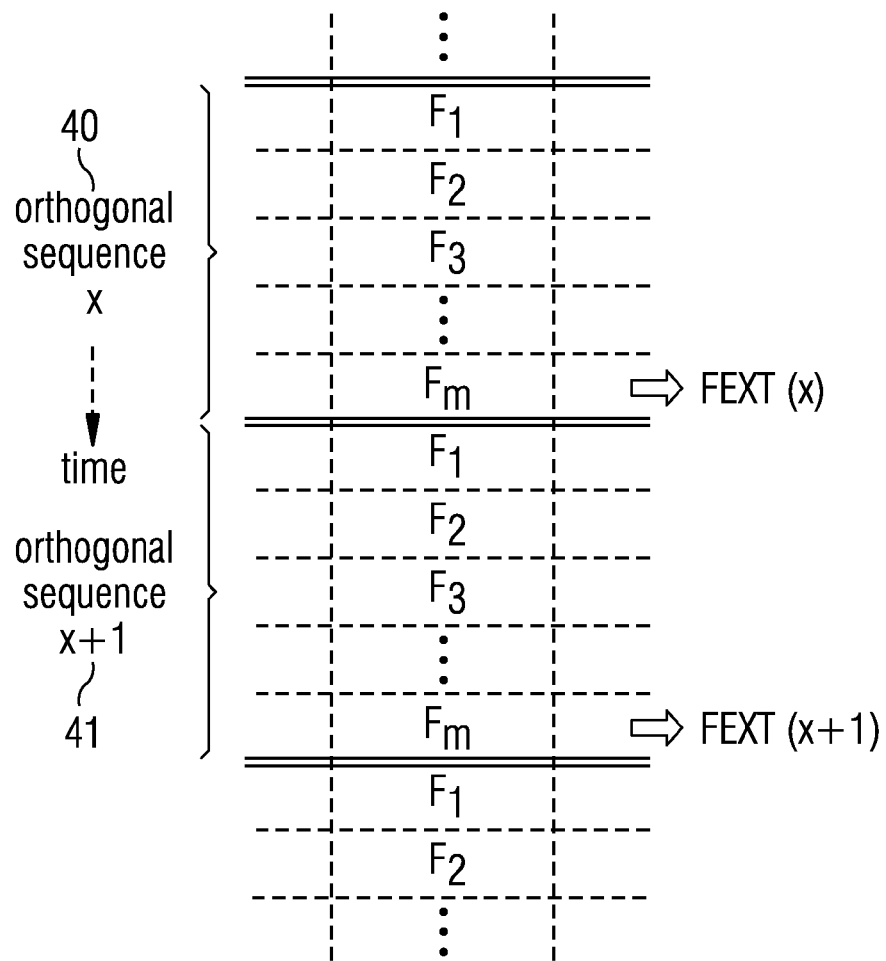
FIG. 4 shows an explanatory diagram for illustrating some features of some embodiments.

In FIG. 4, in the course of a first orthogonal sequence labeled x the vectors $F_1$ to $F_m$ are determined sequentially, and as soon as all these vectors are available the corresponding vector FEXT based on the sequence x, in FIG. 4 labeled FEXT(x) is determined. After that, the orthogonal sequence is repeated (labeled 41 in FIG. 4), i.e., after sequence x sequence x+1 follows, and the procedure is repeated. In other words, the vector FEXT may be determined several times to increase accuracy. For example, with each determination of the vector FEXT coefficients $C_{\to j}$ for precompensating crosstalk from lines in the vectored group to a joining line may be adapted according to $$C_{\to j}(\text{new}) = C_{\to j}(\text{old}) - g \cdot FEXT \quad (21)$$

g is a step size, which for the first iteration, i.e., the first determined vector FEXT, may be set to 1 and then may be reduced for each iteration.

With some of the above-described embodiments, the computational complexity required for calculating FEXT coupling coefficients may be reduced. With some other embodiments which will be explained in the following in more detail, a FEXT vector may already estimated before the completion of an orthogonal sequence. These embodiments may be used in combination with the afore-described embodiments, but the different embodiments may also be used independently from each other.

In particular, in the following embodiments will be described where on each communication connection several communication channels are used for transmitting data. As an example, in DSL systems on each communication line data is transmitted via a plurality of carriers, i.e., frequencies, these carriers also being referred to as tones and being examples for communication channels on a single communication connection. In some of the embodiments described below, each communication channel on a communication connection essentially uses the same orthogonal sequence, but the orthogonal sequences in different channels are shifted with respect to each other.

Such an embodiment may for example be implemented in a DSL system. An example for the implementation of such a DSL system will now be given referring to FIGS. 5 and 6, FIG. 5 showing a DSL communication system in the downstream direction, while FIG. 6 shows a DSL communication system in the upstream direction.

Figure 5:
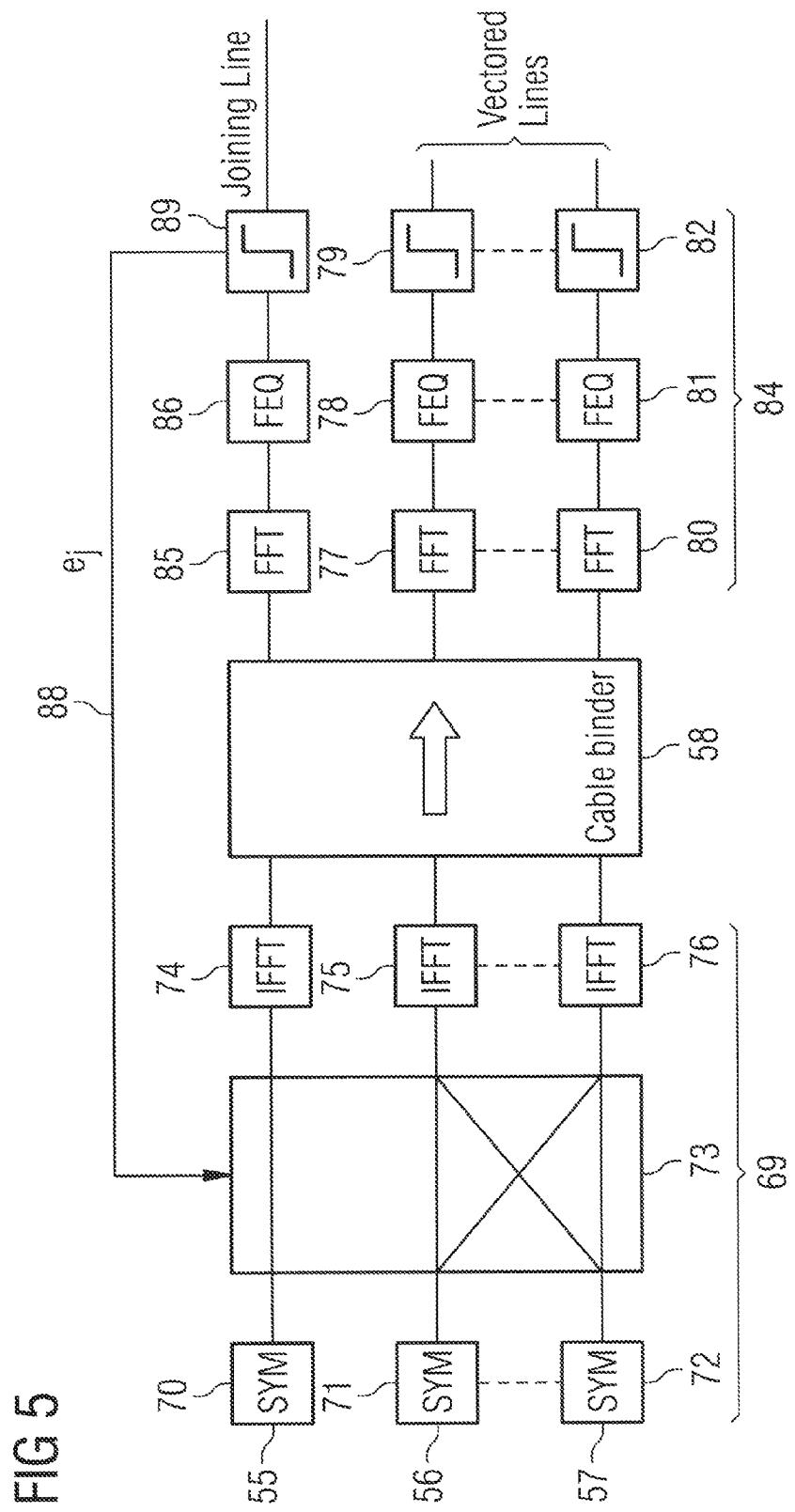
FIG. 5 shows a block diagram of a communication system according to an embodiment.
Figure 6:
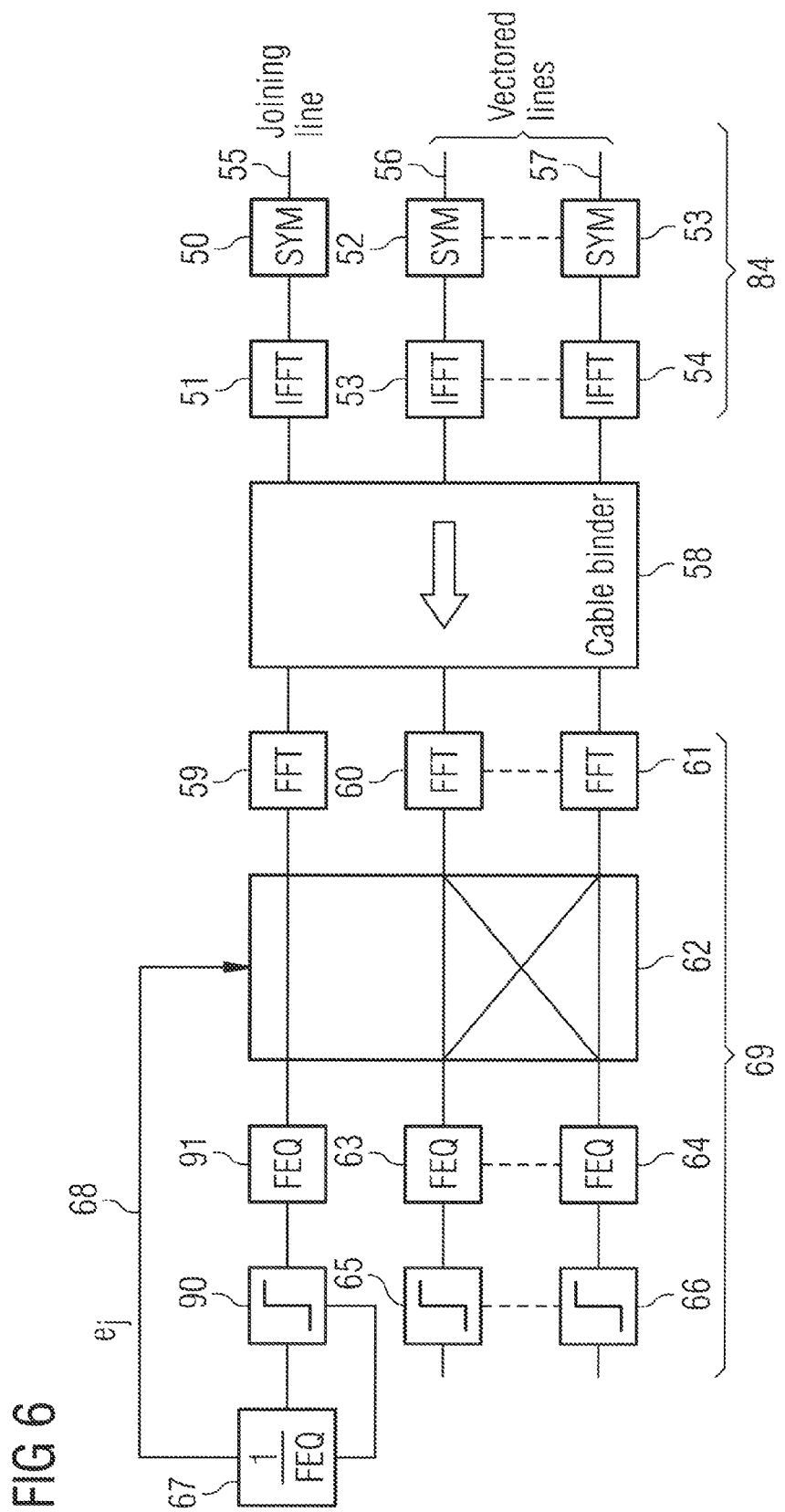
FIG. 6 shows a block diagram of the communication system of FIG. 5 operated in a different transmission direction.

In FIG. 5, a DSL communication system according to an embodiment is shown transmitting data in the downstream direction. In the system shown in FIG. 5, data is transmitted from a central office 69 via a plurality of communication lines 55, 56, 57 to a plurality of receivers in customer premises generally labeled 84. In the system of FIG. 5, the communication lines are joined in a so-called cable binder 58. Communication lines in a cable binder are usually located comparatively close to each other and are therefore prone to crosstalk. In the system shown in FIG. 5, communication lines 56 and 57 as well as further (not shown) communication line indicated by dotted lines are already incorporated in the vectored group. It should be noted that the number of communication lines in a vectored group is not limited to any particular number. Communication line 55 in the example shown is a joining line, i.e., is to be added to the vectored group.

In the system of FIG. 4, symbol mappers denoted with reference numerals 70, 71 and 72 map data, e.g., payload or training or pilot data, onto carrier constellations which are to be transmitted via communication lines 55, 56 and 57, respectively. A crosstalk precompensator 73 modifies these symbol mappings in order to precompensate crosstalk occurring during the transmission. The such modified carrier mappings are modulated onto a plurality of carriers for each communication line, said carriers having different frequencies and being an example for a plurality of communication channels on a single communication connection, and are then transferred into signals in the time domain by inverse fast Fourier transformations 74, 75 and 76, respectively. This type of modulation, also referred to as discrete multi tone modulation (DMT) is commonly used in DSL systems like VDSL systems or VDSL2 systems. The such generated signals are then transmitted via the communication line to the customer premises. The received signals are then converted into the frequency domain by fast Fourier transformers 77, 80 and 85, respectively and equalized by frequency equalizers 78, 81 and 86, respectively before slicers 79, 82 and 89, respectively output received constellations which, in case of an error-free transmission, correspond to input constellations generated in 70, 71, 72 originally intended for transmission. It is to be understood that for clarity's sake only some elements of the communication devices involved are shown, and further devices like amplifiers, sampling units and the like may be present.

In a vector training shown in FIG. 5, crosstalk from the lines already in the vectored group like lines 56 and 57 to the joining line is to be reduced. In another phase, for example a previous phase, the crosstalk from the joining line to the lines already in the vectored group may be reduced.

As already mentioned, for adapting the vectoring which is implemented in this case by crosstalk precompensator 73 to the joining line, synchronization symbols transmitted are modified to form orthogonal pilot sequences. The synchronization symbols on all the lines are sent in a synchronized manner, i.e., at the same time.

In an embodiment, a specific sequence is reserved for joining lines. For example, using the Walsh-Hadamard sequences described above multiplying the synchronization symbols with sequences of +1 and −1 described above, a sequence consisting only of +1 values or of alternating +1 and −1 values may be reserved for joining lines.

Via a respective backchannel in the joining line, an error signal $e_j$ is transmitted back to crosstalk precompensator 73. Error signal $e_j$ as described above for the synchronization symbols is indicative of a difference between the synchronization symbols sent (which are known to the receiver since fixed sequences are used) and the symbols actually received. Based on this error signal, the crosstalk precompensator 73 is adapted to reduce the error, i.e., the difference between symbols sent and symbols received, by reducing the effect of crosstalk from the joining line to the vectored line, for example corresponding to any of the embodiments described above, i.e., either using intermediate vectors or directly calculating the FEXT couplings, or also based on embodiments described below in more detail.

The corresponding system in the upstream direction is shown in FIG. 6.

It should be noted that while in FIG. 5 only a back channel for transmitting an error signal $e_j$ for the joining line is shown, generally such back channels may be provided for all lines to obtain corresponding error signals for all lines for example for continuous adaptation of coefficients during operation or for detection of a disturber line which will be described later.

In FIG. 6, some of the components for data transfer in upstream direction of the communication system already discussed with reference to FIG. 5 are shown. On the side of customer premises equipment 84, symbols 50, 52 and 53 are transmitted via the lines, symbol 50 being transmitted via the joining line 55 and symbols 52 and 53 being transmitted via the vectored lines 56, 57. Again, it should be noted that while only two vectored lines are depicted, they are intended to represent any arbitrary number of vectored lines. The symbols are modulated onto a plurality of carriers for each line corresponding to the already mentioned DMT modulation according to the VDSL2 standard used and transferred into time domain signals by inverse fast Fourier transformers 51, 53 and 54, respectively. The signals are then transmitted in the upstream direction via the respective lines 55, 56 and 57 which are in cable binder 58 to central office 59. Here, the received signals are sampled and transferred to the frequency domain via fast Fourier transformers 59, 60 and 61.

A crosstalk canceller 62 is used to cancel crosstalk occurring between the lines in cable binder 58. It should be noted that crosstalk canceller 62 may fully or partially be implemented using the same circuit elements as crosstalk precompensator 73, for example by using a common digital signal processor, but also may be implemented using separate elements. Similar to what has already been described for the receiver part of customer premises equipment 84 with reference to FIG. 5, in the receiver part of central office 59 shown in FIG. 6 frequency equalizers 63, 64, 91 followed by slicers 65, 66, 90 are provided to recover received symbols which in case of error free transmission correspond to symbols 52, 53, 50 originally sent.

Also, FIG. 6 shows the situation where the crosstalk from the vectored lines to the joining lines is to be reduced. In this case, an error signal $e_j$ is determined based on the received symbols in the joining line, for example by slicer 90, wherein with an element 67 (which is not a mandatory element) the frequency equalization performed in element 91 is reversed. Based on the error signal $e_j$, the vectoring of crosstalk canceller 62 may then be adapted to cancel crosstalk from the lines of the vectored group to the joining lines, for example as already described above with reference to FIGS. 1-4.

While in FIG. 6 the determination of error signal $e_j$ only for the joining line j is shown, generally such error signals may be determined for all lines, for example for continuous adaptation of coefficients during operation or for detection of a disturber line which will be described later.

As already mentioned, in some embodiments where a plurality of communication channels is used for each communication connection, for example a plurality of carriers on each communication line in the embodiments of FIGS. 5-6, in some embodiments sequences of pilot signals usable for vector training or adaptation, also referred to as training sequences hereinafter, are transmitted in a shifted manner for different carriers (tones). In other words, the start of the sequence assigned to a specific communication connection is shifted from one tone to the other. Such embodiments will now be explained in more detail with reference to FIGS. 7-10.

Figure 7:
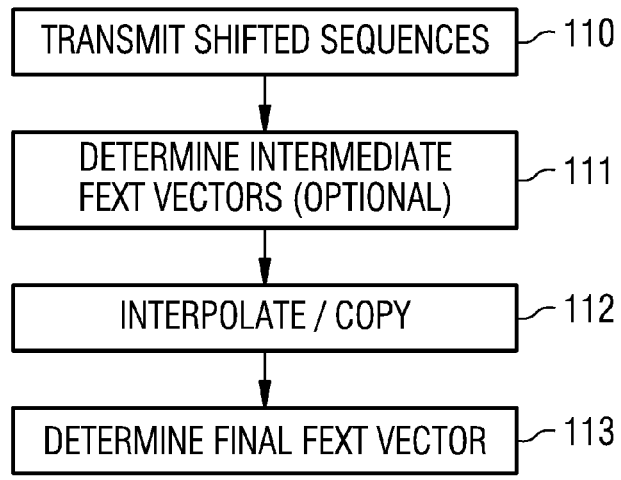
FIG. 7 shows a flow diagram of a method according to an embodiment.

In FIG. 7, a flow diagram of a method according to an embodiment is shown. The method of FIG. 7 may for example be implemented in the system of FIGS. 5 and 6, but is not limited thereto, but may be generally employed in systems where a plurality of communication channels is used on each of a plurality of communication connections.

Figure 8:
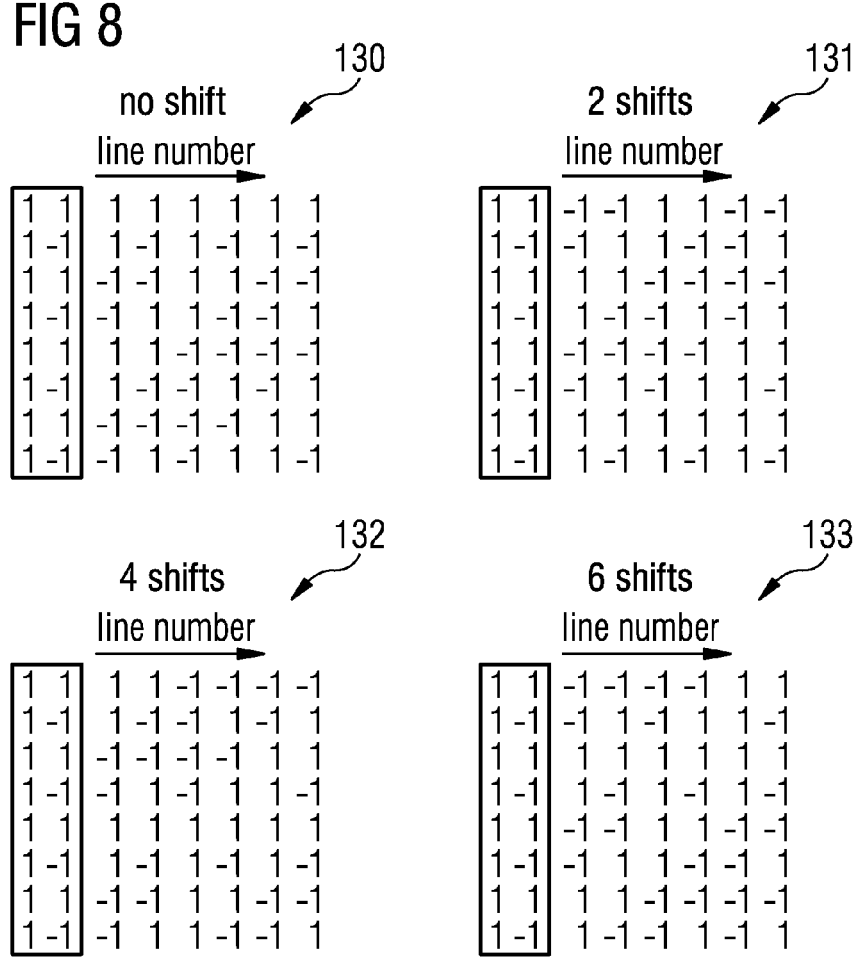
FIG. 8 shows a diagram for explaining some features of some embodiments.

At 110, training sequences are transmitted which, as explained above, are shifted with respect to each other for different communication channels, for example different carriers or tones. This concept of shifting will now be explained using an example with reference to FIG. 8. As an example, Walsh-Hadamard sequences having a length of 8 are used in FIG. 8. FIG. 8 at a portion 130 shows the unshifted sequences. Each sequence is a column in FIG. 8, and as indicated by an arrow the sequences for different lines are adjacent to each other. At 131, the sequences are shown cyclically shifted by two elements.

At 132, the sequences are shown shifted by 4 elements, and at 133, the sequences are shifted by 6 elements. It should be noted that the shifted orthogonal sequences are still orthogonal to each other. In all cases, the first two sequences remain the same (the first sequence consists only of one which stays the same no matter how it is shifted, and the second sequence consists of alternating 1-1 which remains the same when shifted by 2, 4 or 6 elements).

Using the sequences of FIG. 8, for example a first channel may use the non-shifted sequences of 130, a second channel may use the sequences of 131, a third channel the sequences of 132, a fourth channel the sequences of 133, a fifth channel again the sequences of 130, etc. In other words, in an embodiment using the example of FIG. 8, communication channels like carriers or tones may be grouped into groups of four communication channels, wherein each of the communication channels within a group uses a different one of the sequences of 130-133. It should be noted that as evident from FIG. 8, in such an embodiment each communication connection, for example each line, still uses its specific sequence on all its communication channels, wherein this sequence is shifted for some of the channels.

In general, m communication channels may be assigned to a group, in which case for a length of the orthogonal sequence of n, the sequences may be shifted by n/m elements. For example, with the sequences shown in FIG. 8 m=4 and n=8, and the sequences are shifted by 2 elements from 130 to 131, from 131 to 132 and from 132 to 133. Using the Walsh-Hadamard sequence discussed so far, in such a case regardless of the "shifting" the first n/m sequences remain the same. In embodiments, m=4 or m=8 is selected, but other values are equally possible.

For example, in another embodiment, a system may comprise 250 lines, such that n=256 is chosen. m in such a system may be 8, and in such a case a shift by n/m=32 elements may be used from one communication channel to the next within a group. In such a system, the sequences for the first 32 communication connections, for example the first 32 lines, are unchanged.

It should be noted that while in the currently discussed embodiments the sequences are shifted by n/m elements, in other embodiments other shifts, for example also shifts by odd numbers, are possible.

In other words, for systems as described above, for the first n/m lines no shifting is needed, such that the shifting needs only to be employed when the number of active lines in the system exceeds n/m.

At 111, optionally intermediate FEXT vectors F already explained with reference to FIGS. 1-4 are determined.

At 112, in order to be able to determine a FEXT vector, i.e., FEXT coupling coefficients, for a particular communication channel, either intermediate FEXT vectors or error values from other communication channels are copied or used for an interpolation. At 113, the final FEXT vector, i.e., the FEXT coupling coefficients, are determined using the result of 112 and optionally 111.

Figure 9:
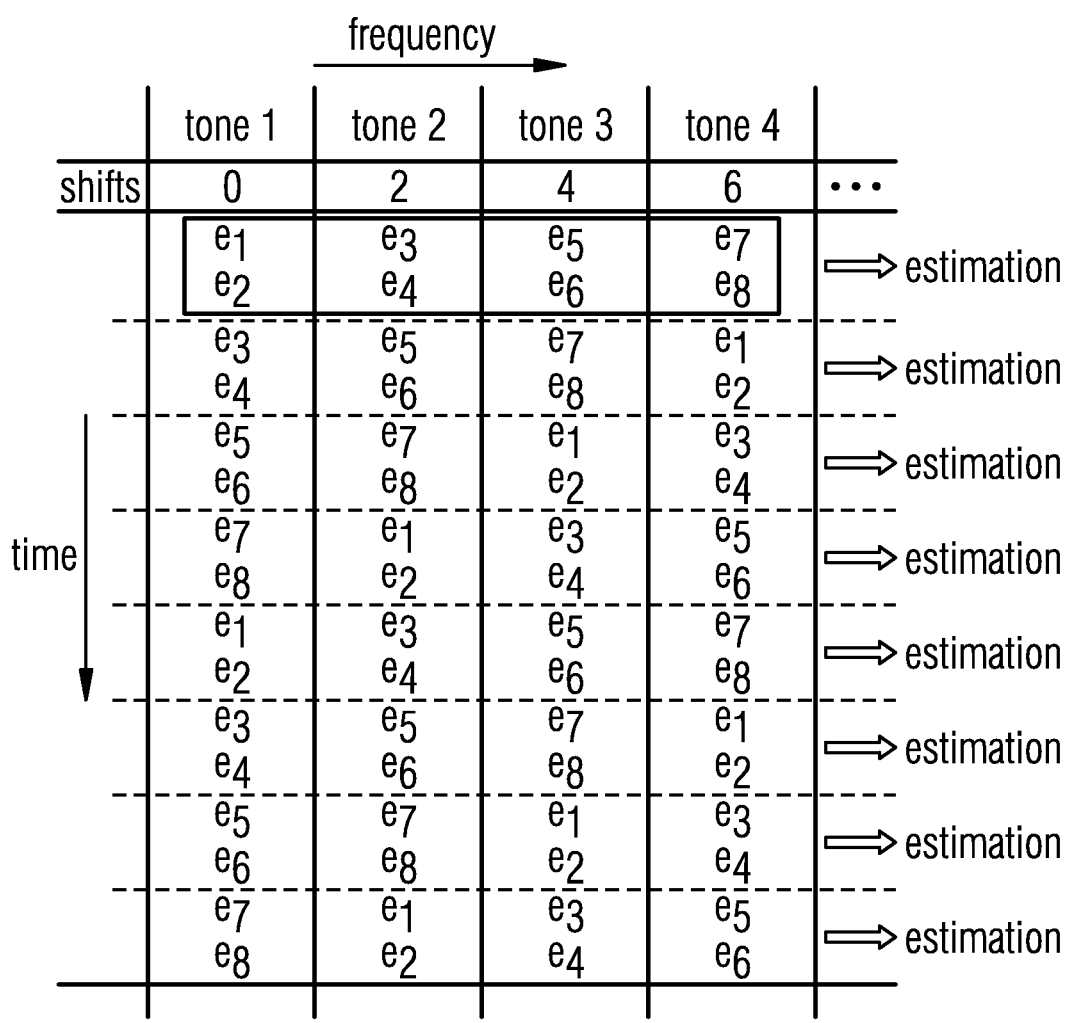
FIG. 9 shows a further diagram for explaining some features of some embodiments.
Figure 10:
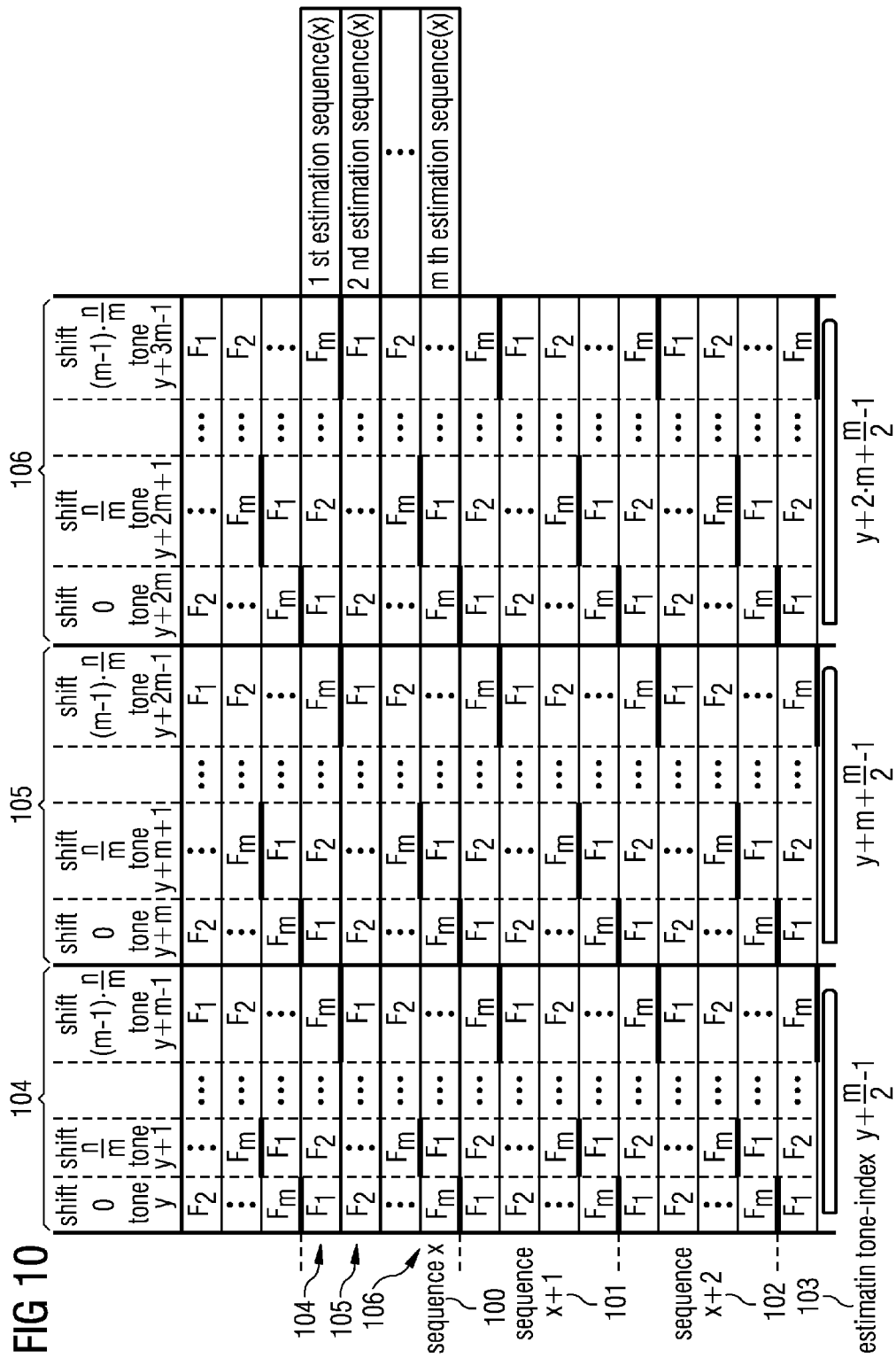
FIG. 10 shows a diagram for illustrating some features or some embodiments.

111-113 will now be further explained using simple examples with reference to FIGS. 9 and 10. FIG. 9 is used for explaining a situation where 111 is not used, whereas FIG. 10 is used for explaining a situation where 111 is used. These examples are intended to illustrate some aspects of the embodiment of FIG. 7 and are not to be construed as limiting.

In FIG. 9, corresponding to the example in FIG. 8, a sequence length n=8 is assumed for illustration purposes. However, it is to be emphasized that other sequence lengths are equally possible. Moreover, again corresponding to FIG. 8, groups of four carriers or tones are used in the example of FIG. 9, corresponding to the columns labeled tone 1 to tone 4 in FIG. 9. For tone 1, a shift of 0 is applied corresponding to group 130 of FIG. 8, for tone 2 a shift of 2 elements corresponding to group 131 of FIG. 8 is applied, for tone 3 a shift of 4 elements corresponding to group 132 of FIG. 8 is applied, and for tone 4 a shift of 6 elements corresponding to group 133 is applied.

In FIG. 9, with $e_1$ the error signal based on the first element of the sequence is denoted, with $e_2$ the error based on the second element of the sequence etc. until $e_8$ which denotes an error based on the $8^{th}$ and last element of the sequence. For example, $e_1$-$e_8$ may correspond to $e_j(1)$ to $e_j(8)$ of equation (1).

In a vertical direction in FIG. 9 as also indicated by an arrow the time is schematically shown. In a first time step, on tone 1 error signal $e_1$ pertaining to the first signals of the pilot signal sequences is obtained, after that on tone 1 signal $e_2$ is obtained etc. On tone 2, since here the sequences are shifted by 2 elements, first $e_3$ is obtained, then $e_4$ etc. On tone 3, corresponding to a shift of 4 elements, first $e_5$ is obtained, then $e_6$ is obtained etc. Finally, on tone 4 corresponding to a shift of 6 elements first $e_7$ is obtained, then $e_8$ is obtained etc.

As explained previously, for determining all FEXT couplings, for example in the form of the vector FEXT, a complete set of 8 error values, one for each element of the sequence, is required. In an embodiment, after the second time step, as can be seen in the example of FIG. 9 on tones 1-4 all together all 8 error values are present albeit for different tones. In an embodiment, an estimation of the FEXT vector is made based on these 8 error vector values. In such embodiments, it is used that for tones or carriers having adjacent frequencies, the crosstalk is often similar. As can be seen in FIG. 9, after a further two times step a further estimation can be made, etc.

In the example of FIG. 9, 8 error values of a group consisting of tone 1 to tone 4 are used for the estimation. In systems with a plurality of tones, as explained above, a plurality of such groups of m tones, 4 tones in the example of FIG. 9 are used. In such embodiments, instead of simply using the error value from the corresponding group (referred to as copy in 112 of FIG. 7), also an interpolation may be carried out. For example, in an embodiment for determining a value to be used for $e_3$ in the example of FIG. 9 for the estimation of tone 1, an interpolation between tone 2 shown and a tone 2 of a group of tones preceding the group shown (for example a group of 4 tones with lower frequencies than the one shown).

It should be noted that as shown in FIG. 9, this estimation after each two time steps can continue and for example be used to further adjust coupling coefficients for example based on equation (21). In other embodiments, this kind of estimation may be terminated after a predetermined time and be replaced by an estimation every eight time steps based only on error values for the specific tone.

As in FIG. 8, the specific values m=4 and n=8 in FIG. 9 serve only as an example for explaining some principles employed in some embodiments, and other values may be used as well.

In the example of FIG. 9, no intermediate FEXT vectors are used, and the FEXT couplings are calculated directly based on the error values e. In another example, for example an embodiment using 111 of FIG. 7, intermediate vectors F as explained with respect to FIGS. 1-4 are used. This will be explained using a diagram example shown in FIG. 10.

In the example of FIG. 10, m tones are provided in each group, wherein m may be equal to 4 as in FIGS. 8 and 9, may be equal to 8 or may assume any other suitable number, for example a power of 2. The sequence length in FIG. 10 generally is n, and the shift between two adjacent tones in group is n/m. In FIG. 10, three groups 104, 105, 106 are shown, but it is to be noted that the number of tones is not particularly limited. The first tone in each group is assigned a shift of 0, the second tone in each group a shift of n/m etc. until the last tone in each group which is assigned a shift of $(n-1)\cdot n/m$.

In the example of FIG. 10, in the first group 104 tones y to y+m−1 are grouped, in the second group tones y+m until tone y+2m−1 etc. In a line 103 a so-called "estimation tone index" is given which corresponds to a center tone in each of the groups.

Training sequences, i.e., sequences of pilot signals usable for vector training or adaptation, for example based on orthogonal Walsh-Hadamard sequences, are used as explained previously, of which three consecutive sequences 100 (sequence x), 101 (sequence x+1) and 102 (sequence x+2) are shown. The number of three sequences shown again serve merely as an example, and any desired number of sequences starting from a single sequence may be used.

At a beginning portion 104 of sequence 100, on tones y, y+m, y+2m etc., i.e., the first tone in each group, error values corresponding to the first n/m sequence elements are determined, on the second tone in each group error values pertaining to the second n/m sequence elements are determined etc. For example, for n=8 and m=2 as can be seen from FIG. 9 in 104 $e_1$ and $e_2$ would be determined for tone y, $e_3$ and $e_4$ would be determined for tone y+1 etc.

Based on these error values, intermediate vectors $F_1$ to $F_m$ are determined after n/m time steps, i.e., after the portion 104 of sequence x. This determination may be made for example based on equations (16) to (18), the vector $e_{j,1}$ corresponding to the vector of the n/m error values determined for tone y, the vector $e_{j,2}$ corresponding to the n/m error values determined for tone y+1 etc.

After portion 104 of sequence x has passed, vectors $F_1$ to $F_m$ are determined for each of groups 104-106, albeit for different tones. Similar to what was explained for FIG. 9, based on these m vectors F a first estimation of the vector FEXT, i.e., of the FEXT couplings, may be made based on equations (19) and (20). In this case, basically the values F are "copied" from the other tones to a specific tone of a group. In other embodiments, an interpolation may be performed. For example, to determine an $F_2$ for estimating FEXT couplings for tone y+m, an interpolation may be made between $F_2$ determined for tone y+m+1 and $F_2$ determined for tone y+1. More complex interpolations using more values, for example additionally the value for tone y+2 m+1 in the above example, are equally possible.

After portion 105 of sequence x, again m vectors F are determined for each group which may be used for a second estimation, etc., until after portion 106 an m-th estimation may take place.

Also in this case, the above scheme may be repeated and the vectoring may be adapted according to equation (21), or after some time, for example after sequences 100 and 101, a switch may be made to determining the FEXT coefficients for a specific tone based only on intermediate vectors for these tones. For example, the estimation indicated for sequence 100 may be continued for sequence 101, and then the next estimation may be made only after completion of sequence 102 based on $F_1$ to $F_m$ for each tone. In yet other embodiments, the grouping may be changed at one or more points in time. For example, in the embodiment represented by FIG. 10, at some point in time, for example after completion of a sequence like sequence 100, 101 or 102, the grouping of the tones may be changed. For example, the tones may be regrouped such that tones y+m/2−1 to y+m+m/2−2, tones y+m+m/2−1 to y+2 m+m/2−2 etc. form a group or, in other words, the tones which in FIG. 10 are at the "center" of a group are now at the border of the group. Other regroupings are also possible, for example the "group In embodiments, information regarding the sequence shift explained above is exchanged between communication devices, for example between communication device 10 and communication devices 16-19 in FIG. 1. For example, if an additional line becomes active, a central office equipment, for example communication device 10 of FIG. 1 or communication device 69 of FIGS. 5 and 6, may inform a downstream end, for example, communication devices 16-19, of a shift to be used.

The embodiments explained with reference to FIGS. 7-10 may be used both in the downstream direction (as for example shown in FIG. 5) and in the upstream direction (as shown for example in FIG. 6). Moreover, while the situation where crosstalk from a plurality of lines in the vectored group to a joining line is to be cancelled has been used as an example, the above embodiments may also be used for cases where crosstalk from a joining line to vectored lines is cancelled. In this case, for example in FIGS. 5 and 6 error values are determined at the lines already in the vectored group and used for adaptation of the vectoring. In still other embodiments, the two cases are handled jointly, i.e., error signals or values from all involved communication connections, both those in the vectored group and those joining, are used for adaptation of the vectoring.

Moreover, the above embodiments, i.e., calculating the FEXT coefficients based on intermediate vectors and the use of shifted sequences for earlier estimation, may not only be used when a communication connection joins a vectored group, but also during a so-called tracking where cross coupling coefficients are adapted or adjusted during data transmission to accommodate changing line conditions.

Figure 11:
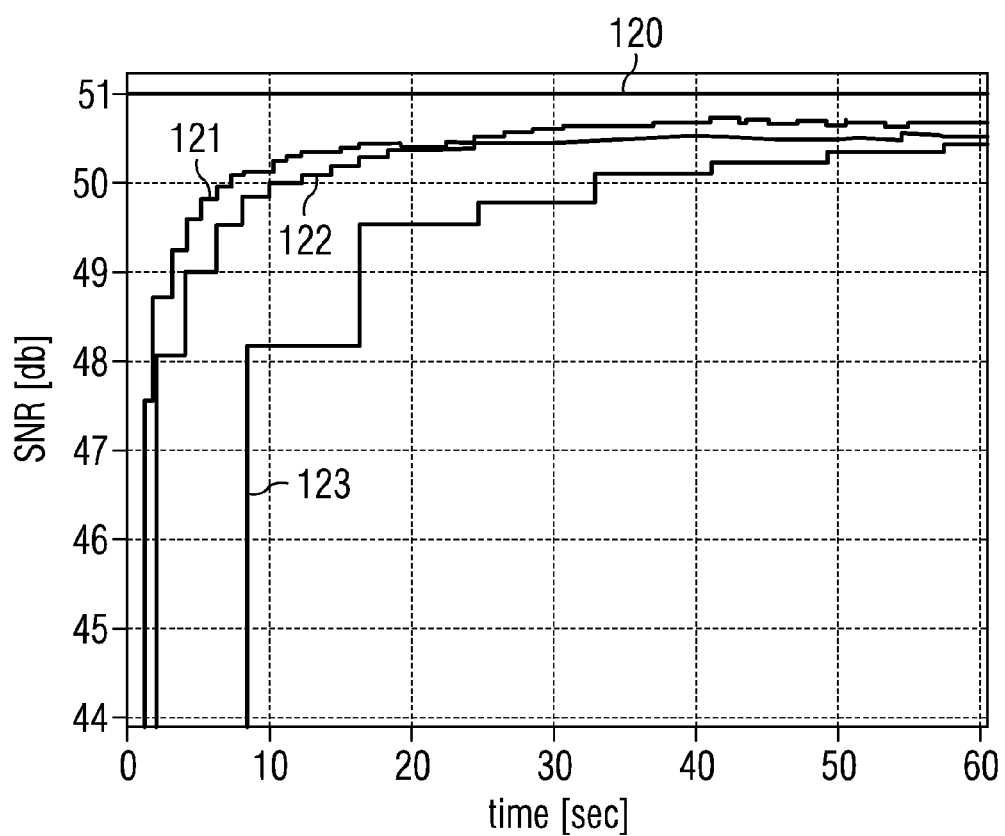
FIG. 11 shows simulation results for some implementations of embodiments.

With embodiments like the ones discussed with reference to FIGS. 7-10, a fast adaptation is possible. In this respect, FIG. 11 shows a simulation where the signal to noise ratio for a frequency of 5.2 MHz is shown over time for a simulated system of 99 active lines and a orthogonal sequence length n=128. A curve 120 shows the signal to noise ratio without crosstalk, i.e., the optimum which would be attainable with complete crosstalk cancellation or precompensation. Curve 123 shows the development after the start of the adaptation of the vectoring for a conventional system which does not use groupings of tones, but which determines a vector FEXT each time after a complete training sequence has been transmitted. Curve 121 shows the situation with m=8, i.e., 8 tones per group with shifted sequences (a shift of 16 elements in this case) and curve 122 shows the simulation result for 4 tones per group (a shift of 32 elements). As can be seen, with the grouping of some embodiments a faster rise of the signal to noise ratio can be obtained, which in turn for example enables a joining line to become active faster.

With embodiments like the ones discussed with reference to FIGS. 7-10, as mentioned above shifted sequences are used to be able to estimate FEXT coefficients quickly. In other embodiments, shifted sequences are used to be able to determine a communication connection for which a crosstalk coupling to one or more other communication connections suddenly increases. Corresponding embodiments may be implemented in DSL systems as previously discussed with reference to FIGS. 5 and 6, but are not limited thereto.

Sudden changes of the crosstalk coupling between communication connections, which for example correspond to sudden changes in the FEXT coefficients mentioned above, may for example be caused by failure of components associated with a communication connection in communication devices, loose connections, or a communication connection leaving a vectored group in an irregular way, i.e., not according to a standard protocol. In the following, embodiments will be described which enable a determination of a communication connection which significantly disturbs one or more other communication connections. While these embodiments are described as an addition to the previously discussed embodiments of FIGS. 7-10, they also may be used independently therefrom.

In some of the embodiments described in the following, shifted sequences are used to provide each communication connection with a distinct "signature," i.e., a distinct sequence over a plurality of communication channels of the communication connection. This will be explained in the following in more detail with reference to FIGS. 12 and 13, wherein as an example a DSL system with a plurality of tones on each communication line as explained previously is used.

As explained with reference to FIGS. 7-10, also in the embodiment of FIGS. 12 and 13 groups of m tones are formed, which in the context of FIG. 12 are referred to as subgroups. In FIG. 12, three of such subgroups, labeled subgroup #1, subgroup #2 and subgroup #3 are shown. n/m subgroups form a main group, of which one, main group #1, is shown in FIG. 12. n is the length of the sequences, in this case for example Walsh-Hadamard sequences. Within each subgroup of m tones, the sequences are shifted from tone to tone by n/m elements, as described previously. The number of elements by which the sequence is shifted for each tone is given in the table of the upper portion of FIG. 12 for the subgroup #1. This shifting essentially corresponds to the shifting explained with reference to FIG. 10, i.e., the shifts in the subgroup #1 of FIG. 12 corresponds to the shifts explained for group 104 in FIG. 10.

Furthermore, in the embodiment of FIG. 12 within each main group the sequences are shifted from subgroup to subgroup. For example, in the embodiment of FIG. 12 in subgroup #2 an additional shift of one element is performed compared to the subgroup #1, and in subgroup #3 a further shift by one element is added, such that in subgroup #2 the sequence for the first tone of the subgroup (tone number n+1) is shifted by one element instead of zero elements in subgroup #1, and the sequence of the first tone of subgroup #3 (tone number 2*(n+1) is shifted by two elements. In the embodiment of FIG. 12, the additional shift thus introduced is constant in each group. For example, in FIG. 12, all the sequences in subgroup #2 are shifted by one additional element compared to the sequences in subgroup #1, and the sequences in subgroup #3 are shifted by two additional elements compared to the sequences in subgroup #1.

An example for this additional shifting will now be given with reference to FIG. 13. In the example of FIG. 13, it is assumed that eight lines are used, and the length of the Walsh-Hadamard sequences n correspondingly also is equal to eight. A Walsh-Hadamard matrix containing in the rows (or columns) the sequences assigned to the individual lines is generally labeled 130 in FIG. 13.

Figure 13:
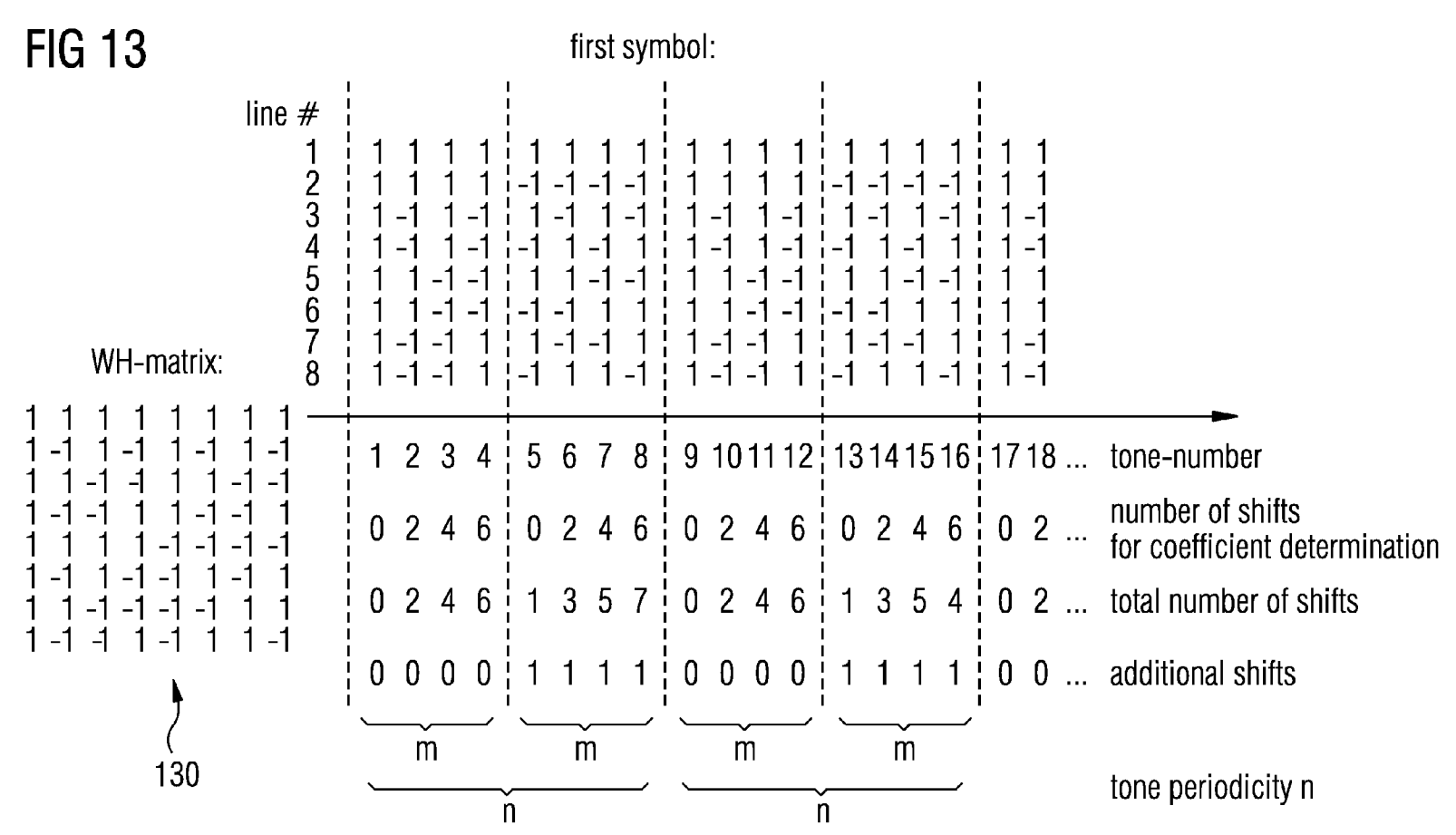

In FIG. 13, the first symbol for tones 1-18 of each line are shown. In other words, based on the sequences defined by the Walsh-Hadamard sequence 13 for each of the eight lines the factor (+1 or −1) used for the first pilot symbol of a sequence for the different tones is shown. For tones with no shifting, these factors correspond to the first row (or column) of matrix 130, for example for tones 1 or 9, whereas for the other tones because of shifting other factors from columns (or rows) apply.

Below the portion showing the first symbol for each line depending on the tone number, the number of shifts for coefficient determination, i.e., the number of elements the sequences are shifted for the method described with reference to FIGS. 7-10, is shown. The additional shifts now introduced as explained above with reference to FIG. 12 are also given, together with the total number of shifts, i.e., the total number of elements shifted. It should be noted that since in the example of FIG. 13 n=8 and m=4, two subgroups for each main group, each subgroup comprising four tones, are provided. However, it is to be emphasized that the numbers given in FIG. 13 serve only as illustrating examples, and other numbers for n and m and also other orthogonal sequences are equally possible.

With shifts like the one explained with reference to FIGS. 12 and 13, in each main group and for each symbol each line has a distinct sequence of values over its tones. For example, in FIG. 13 for tones 1-8 a vector comprising as elements the values of the first symbol for tones 1-8 (or tones 9-16, etc.) are different for each line. As will be explained in the following, these different values may be used for identifying a line, for example a "disturber" line causing excessive crosstalk to other lines.

Figure 14:
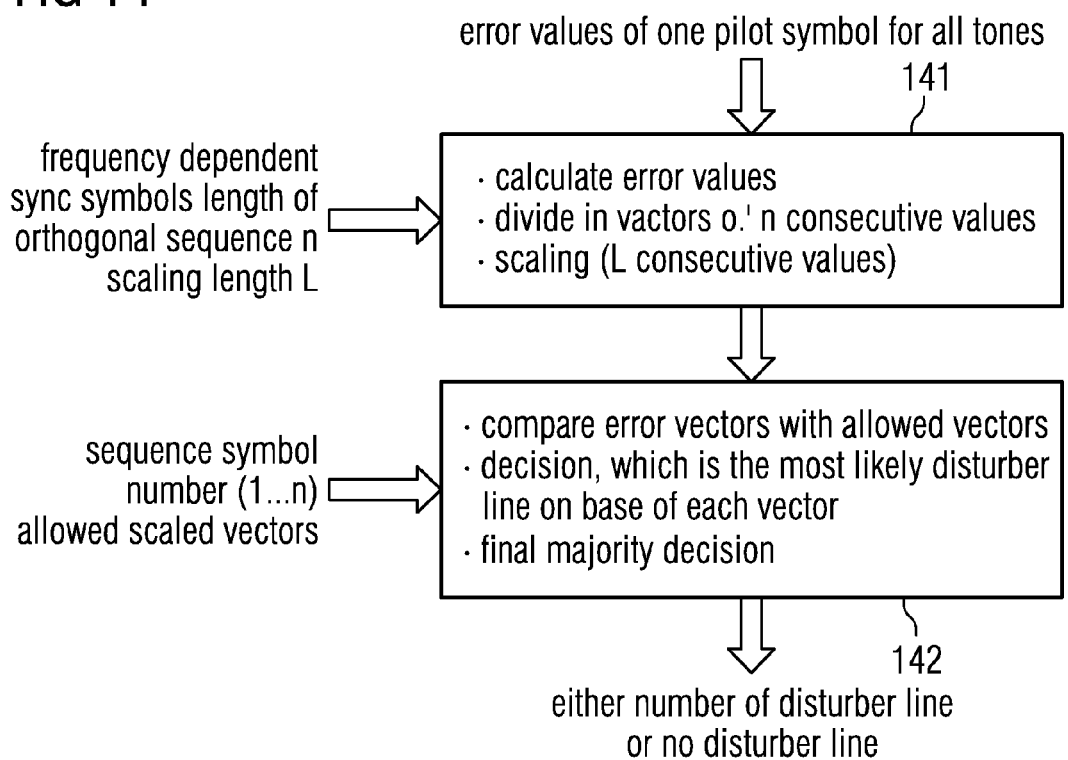
FIG. 14 shows a flow diagram of a method according to an embodiment.

A method according to an embodiment which may be used for determining such a line is shown in FIG. 14. At 141, error values of one pilot symbol for all tones are received. Furthermore, the frequency dependency of the modified synchronization symbols used as pilot symbols, i.e., information about how much the sequence is shifted on each tone, the length of the orthogonal sequences n used and a scaling length L is provided.

Without far end crosstalk, the difference between sent and received symbols e in a DSL system like the one shown in FIG. 5 or FIG. 6 may be written as $$e(q) = \text{Feq} \ast r_x^q = r(q) \quad (22)$$

wherein the vector e(q) comprises the error values for all lines involved at a time q, Feq is a matrix describing the operation of a frequency equalizer, $r_x(q)$ is a vector containing the noise values for each line a time q at the receiver input and r(q) is an abbreviation for Feq*$r_x(q)$.

With far end crosstalk, the vector e(q) may be calculated as $$e(q) = \text{Feq} \ast \text{Fext}_x \ast u(q) + r(q) = \text{Fext} \ast u(q) + r(q) \quad (23)$$

Fext$_x$ is the FEXT matrix without taking the frequency equalizer into account, and Fext is the normalized FEXT matrix, i.e., the Fext matrix with the frequency equalization being taken into account. As the frequency equalization acts based on known parameters, the two matrixes Fext$_x$ and Fext may be freely converted into each other. Consequently, determining one of the matrixes means also determining the other one. The matrix Fext may for example comprise the vector FEXT for all lines j as defined with reference to equations (1) and (2). It should be noted that for example in the system of FIG. 5 the error signal is determined after the frequency equalization, and therefore the error signal corresponds to the one defined by equation (23). On the other hand, in an embodiment similar to the one of FIG. 6 with an element like element 67 present which reverses the frequency equalization the error signal would correspond to Fext$_x$*u+$r_x$ with the optional element 67 and would be calculated according to equation (23) without such an element.

The matrix Fext may be written as $$\text{Fext} = \begin{bmatrix} 0 & x_{1,2} & x_{1,3} & \ldots & x_{1,M} \\ x_{2,1} & 0 & x_{2,3} & \ldots & x_{2,M} \\ x_{3,1} & x_{3,2} & 0 & \ldots & x_{3,M} \\ \vdots & \vdots & \vdots & \ddots & \vdots \\ x_{M,1} & x_{M,2} & x_{M,3} & \ldots & 0 \end{bmatrix}, \quad (24)$$

wherein $x_{i,j}$ represents the effective coupling from line j to i. Effective in this respect means that in a vectored system, the crosstalk coupling coefficients FEXT$_{i \to j}$ are "counter acted" by the vectoring, and the coefficients $x_{i,j}$ of equation (24) already take the reduction by vectoring into account. In other words, in a system without vectoring the values x would correspond to the values FEXT of equation (1).

In an ideally cancelled system, i.e., if through the vectoring the crosstalk between the lines of the vectored group is at least essentially precompensated or cancelled, the values $x_{i,j}$ are at or near zero. If now as mentioned above a single line is disturbed, i.e., suddenly causes crosstalk to other lines and/or experiences crosstalk from other lines, but otherwise the vectored system suppresses the crosstalk, the matrix Fext may be at least approximately written as $$\text{Fext} = \begin{bmatrix} 0 & 0 & \ldots & 0 & x_{1,p} & 0 & \ldots & 0 \\ 0 & 0 & \ldots & 0 & x_{2,p} & 0 & \ldots & 0 \\ \vdots & \vdots & \ddots & \vdots & \vdots & \vdots & \ddots & \vdots \\ 0 & 0 & \ldots & 0 & x_{p-1,p} & 0 & \ldots & 0 \\ x_{p,1} & x_{p,2} & \ldots & x_{p,p-1} & 0 & x_{p,p+1} & \ldots & x_{p,M} \\ 0 & 0 & \ldots & 0 & x_{p+1,p} & 0 & \ldots & 0 \\ \vdots & \vdots & \ddots & \vdots & \vdots & \vdots & \ddots & \vdots \\ 0 & 0 & \ldots & 0 & x_{M,p} & 0 & \ldots & 0 \end{bmatrix}. \quad (25)$$

In this case, it has been assumed that the disturber line is line number p. In the p-th line of the matrix Fext of equation (25), the coupling from all other lines to the disturber line p is described and in the p-th column, the coupling from the disturber line p to all other lines is described.

As a simplification, for the following analysis it is assumed that r=0, i.e., an ideal system without noise is assumed. However, the influence of noise in real systems will be discussed later. Then, according to equation (23) the error vector e(q), which here is denoted by $e_{disturbed}$, $$e_{disturbed} = \begin{bmatrix} 0 & 0 & \ldots & 0 & x_{1,p} & 0 & \ldots & 0 \\ 0 & 0 & \ldots & 0 & x_{2,p} & 0 & \ldots & 0 \\ \vdots & \vdots & \ddots & \vdots & \vdots & \vdots & \ddots & \vdots \\ 0 & 0 & \ldots & 0 & x_{p-1,p} & 0 & \ldots & 0 \\ x_{p,1} & x_{p,2} & \ldots & x_{p,p-1} & 0 & x_{p,p+1} & \ldots & x_{p,M} \\ 0 & 0 & \ldots & 0 & x_{p+1,p} & 0 & \ldots & 0 \\ \vdots & \vdots & \ddots & \vdots & \vdots & \vdots & \ddots & \vdots \\ 0 & 0 & \ldots & 0 & x_{M,p} & 0 & \ldots & 0 \end{bmatrix} \cdot \quad (26)$$

$$\begin{bmatrix} u_1 \\ u_2 \\ \vdots \\ u_{p-1} \\ u_p \\ u_{p+1} \\ \vdots \\ u_M \end{bmatrix} = \begin{bmatrix} x_{1,p} \cdot u_p \\ x_{2,p} \cdot u_p \\ \vdots \\ x_{p-1,p} \cdot u_p \\ \sum_{i \ne p}(x_{p,i} \cdot u_i) \\ x_{p+1,p} \cdot u_p \\ \vdots \\ x_{M,p} \cdot u_p \end{bmatrix}$$

wherein $u_j$ is the pilot symbol sent on line j transmitted i at the relevant time. T$_o$ simplify the notation, the index q of equation (23) has been omitted in equation (26).

Equation (26) is valid for each individual tone. For a specific tone k, the error $e^{(k)}$ can be written as $$e^{(k)} = \begin{bmatrix} x_{1,p}^{(k)} \cdot u_p^{(k)} \\ x_{2,p}^{(k)} \cdot u_p^{(k)} \\ \vdots \\ x_{p-1,p}^{(k)} \cdot u_p^{(k)} \\ \sum_{i \ne p} x_{p,i}^{(k)} \cdot u_i^{(k)} \\ x_{p+1,p}^{(k)} \cdot u_n^{(k)} \\ \vdots \\ x_{M,p}^{(k)} \cdot u_p^{(k)} \end{bmatrix} = u_n^{(k)} \cdot \begin{bmatrix} x_{1,p}^{(k)} \\ x_{2,p}^{(k)} \\ \vdots \\ x_{p-1,p}^{(k)} \\ 0 \\ x_{p+1,p}^{(k)} \\ \vdots \\ x_{M,p}^{(k)} \end{bmatrix} + \begin{bmatrix} 0 \\ 0 \\ \vdots \\ 0 \\ \sum_{i \ne p} x_{p,i}^{(k)} \cdot u_i^{(k)} \\ 0 \\ \vdots \\ 0 \end{bmatrix} \quad (27)$$

The errors for tones k to k+L, L being an integer, may be written as $$E = [e^{(k)}, e^{(k+1)}, \ldots e^{(k+L)}] \qquad (28)$$

$$= \begin{bmatrix} x_{1,p}^{(k)} \cdot u_p^{(k)} & x_{1,p}^{(k+1)} \cdot u_n^{(k+1)} & \ldots & x_{1,p}^{(k+L)} \cdot u_p^{(k+L)} \\ x_{2,p}^{(k)} \cdot u_p^{(k)} & x_{2,p}^{(k+1)} \cdot u_p^{(k+1)} & \ldots & x_{2,p}^{(k+L)} \cdot u_p^{(k+L)} \\ \vdots & \vdots & \ldots & \vdots \\ x_{p-1,p}^{(k)} \cdot u_p^{(k)} & x_{p-1,p}^{(k+1)} \cdot u_p^{(k+1)} & \ldots & x_{p-1,p}^{(k+L)} \cdot u_p^{(k+L)} \\ \sum_{i \neq p} x_{p,i}^{(k)} \cdot u_i^{(k)} & \sum_{i \neq p} x_{p,i}^{(k+1)} \cdot u_i^{(k+1)} & \ldots & \sum_{i \neq p} x_{p,i}^{(k+L)} \cdot u_i^{(k+L)} \\ x_{p+1,p}^{(k)} \cdot u_p^{(k)} & x_{p+1,p}^{(k+1)} \cdot u_p^{(k+1)} & \ldots & x_{p+1,p}^{(k+L)} \cdot u_p^{(k+1)} \\ \vdots & \vdots & \ldots & \vdots \\ x_{M,p}^{(k)} \cdot u_p^{(k)} & x_{M,p}^{(k+1)} \cdot u_p^{(k+1)} & \ldots & x_{M,p}^{(k+L)} \cdot u_p^{(k+L)} \end{bmatrix}$$

In an embodiment, L is an odd number. In a different embodiment, L is an even number which is not a power of two. In an embodiment, L is chosen such that the couplings $x_{i,j}^{(k)}$ to $x_{i,j}^{(k+L)}$ for a predetermined combination i, j remain approximately constant. L may be smaller than n or equal to n.

As can be seen in equation (28), the error values on each not disturbed line depend on the corresponding Fext couplings and the symbols, for example pilot symbols, u transmitted on the disturber line p.

Each line of the matrix E of equation (28) comprises the error values or a particular line.

These error vectors in the embodiment of FIG. 13 are calculated at 141.

At 141, after the calculation of the error values, the error values are divided in vectors of error values, each vector consisting of n consecutive values for each line. In other words, the values associated with one main group as explained with reference to FIGS. 12 and 13 are grouped in a vector. Next (or before), in the embodiment of FIG. 14 a scaling operation for L consecutive values is performed. If the "scaling length" L is smaller than n, components from two or more scaled vectors are used to form a further scaled vector of length n.

As already mentioned, L consecutive values of the error vector for a line j, j≠p, starting with value k may be written as $$e_i^{(k),L} = [x_{i,p}^{(k)} \cdot u_p^{(k)}, x_{i,p}^{(k+1)} \cdot u_p^{(k+1)}, \ldots x_{i,p}^{(k+L)} \cdot u_p^{(k+L-1)}] \qquad (29)$$

Each of these vectors corresponds to one of the lines of the matrix E of equation 28. This error is then scaled by the first value, i.e., all elements of the vector are divided by $x_{i,p}^{(k)} \cdot u_p^{(k)}$. This leads to a normalized vector $\hat{e}_i^{(k),L}$ according to $$\hat{e}_i^{(k),L} = \left[1, \frac{x_{i,p}^{(k+1)}}{x_{i,p}^{(k)}} \cdot \frac{u_p^{(k+1)}}{u_p^{(k)}}, \ldots \frac{x_{i,p}^{(k+L-1)}}{x_{i,p}^{(k)}} \cdot \frac{u_p^{(k+L-1)}}{u_p^{(k)}}\right] \qquad (30)$$

As mentioned above, L is chosen such that the couplings $x_{i,p}$ are at least approximately constant. Therefore, the vector $\hat{e}_i^{(k),L}$ may be approximately written as $$\hat{e}_i^{(k),L} \approx \left[1, \frac{u_p^{(k+1)}}{u_p^{(k)}}, \ldots \frac{u_p^{(k+L-1)}}{u_p^{(k)}}\right] \qquad (31)$$

as the ratios of the x are approximately equal to 1.

As already explained in detail, the values u for the pilot signals, for example at positions of synchronization symbols, are generated by multiplying the synchronization symbols with predetermined orthogonal sequences, for example Walsh-Hadamard sequences. Therefore, the $u_p^{(k)}$ may be written as $$u_p^{(k)} = o_p^{(k)} \cdot s^{(k)} \qquad (32),$$

wherein $o_p^{(k)}$ is the real orthogonal sequence of +1 and −1, which is dependent on the line number p (as each line as explained is assigned its own sequence) and also dependent on the tone number k because of the shifting. $s^{(k)}$ represents the complex synchronization symbol, which is independent on the line number (as for example according to DSL standards all lines use the same synchronization symbol), but which is dependent on the tone number. In general, the value of $s^{(k)}$ is selected from +1, −1, +j and −j, j being the imaginary unit in this case.

For the following analysis it is assumed that $s^{(k)}=1$ without loss of generality. For arbitrary values of $s^{(k)}$, all the components of the vector defined in equation (29) are divided by the respective value $s^{(k)}$. In this case, the components of the vector defined in equation (30) as can be seen from equation (31) are approximately either +1 or −1.

The vectors determined by equation (31) are determined for each communication line of the vectored group in an embodiment.

At 142 in FIG. 14, "allowed" scaled vectors for all sequence symbol numbers and all lines are provided. "Allowed" vectors refers to those sequences of +1 and −1 which correspond to possible values for vectors scaled according to equation (31).

The allowed scaled vectors in the embodiment of FIG. 14 have a length of n, i.e., a length corresponding to the length of the Walsh-Hadamard sequences. In other embodiments, other lengths may be used.

Figure 15:
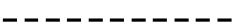
FIG. 15 shows a diagram for illustrating some features of some embodiments.

The allowed vectors are those sequences of +/−1 which are calculated according to equation (31) taking the sequence sent on the respective line into account. As explained already with reference to FIGS. 12 and 13, through shifting unique sequences of +1 and −1 are applied to each main group of n consecutive tones for each line. Consequently, there is also one unique scaled vector for each line p given a particular scaling length L. Examples for such allowed scaled vectors are shown in FIG. 15 for n=8 and a scaling length L=4. Generally labeled 152 are allowed scaled vectors with length n, i.e., length 8 for the first synchronization signal of a sequence sent, and labeled 151 are allowed scaled vectors for a second synchronization symbol sent and analyzed in the above-explained way.

For the first line, the allowed scaled vector consists only of +1, as the Walsh-Hadamard sequence for the first line consists only of +1.

For the second line as disturber line, the allowed scaled vector has the sequence as shown in the second line of 152 of FIG. 15. The first five elements correspond to the elements assigned to tones 1-5 of line 2 according to FIG. 13, as the first element (assigned to tone 1) is a +1 and division by +1 according to equation (31) during the scaling does not change anything. Elements 6, 7 and 8 correspond to the negative of the elements assigned to tones 6, 7 and 8 of line 2 of FIG. 13 as the first element of the second group of L=5 tones, i.e., the element of tone number 6 is −1 and therefore the scaling changes the signs according to equation (32). In a similar manner, the allowed scaled vectors for the remaining lines are determined. For the second symbol, accordingly the elements assigned to the second symbol according to the Walsh-Hadamard sequences used are taken as a basis.

For each line, in an embodiment a plurality of (scaled) error vectors is determined at 141 as already explained, e.g., one scaled error vector for each of a plurality of main groups of tones as defined with respect to FIG. 12 and compared with the allowed scaled vector. All or a part of the tones of a particular line may be used to this end. In case of an ideal system without noise, based on error values for each line (apart from the disturber line) and each scaled error vector the same line is then identified as the disturber line. Through noise, the determination may deviate for different lines and different error vectors. In other words, through the influence of noise and also because equation (31) as explained is an approximation, the elements calculated at 141, i.e., the scaled error vectors, are not exact sequences of +1 and −1, but may contain other values, and in an embodiment for each scaled error vector the line is identified as disturber line the allowed scaled vector of which has the closest resemblance to the determined vector, for example by using any vector metric (for example the sum of the squares of the differences of the elements). In the embodiment of FIG. 14, the line identified by a majority of all the scaled error vectors calculated for a particular (non-disturber) line involved is taken as disturber line. In embodiments, a minimum number may be predetermined regarding how many error vectors have to identify a specific line as disturber line. For example, it may be predetermined that a disturber line is only identified if at least half of the 8 error vectors of a particular line identify the same disturber line. In such a case, in the embodiment of FIG. 14 the number of the disturber line is output, or it is output that no disturber line has been identified by a particular line if the necessary majority has not been obtained. In this way, for each line a disturber line may be identified. In embodiments where the evaluation of the error vectors is performed at the same location, e.g., at a central office, also results for different lines may be compared.

When a disturber line has been identified, the coefficients for this line may be adapted, recalculated (for example by repeating the joining process for the disturber line), or the disturber line may be shut down.

It should be noted that while in principle a single symbol is sufficient for determining the disturber line, in some embodiments a predetermined number of symbols may be taken into account before a decision is taken.

The concept of the majority vote will be illustrated with reference to FIGS. 16 and 17 using a simulation. For the simulation, a VDSL system with 32 lines of 500 m length each was used. The lines were assumed to be AWG (American Wire Gange) 24 lines. The noise was assumed to be −135 dbm/Hz.

Line number 10 was simulated as being a disturber line, i.e., as causing crosstalk in other lines. The first two downstream bands of VDSL were used, a first band from 276 kHz to 3.75 MHz, and a second band from 5.2 MHz to 8.5 MHz. In the simulation, the crosstalk the disturber line 10 caused in other lines varied. In FIG. 16, results for a line experiencing the greatest crosstalk and a line experiencing the smallest crosstalk, lines 18 and 14 in the simulation, respectively, are shown. A curve 161 shows the influence of crosstalk on line number 14, i.e., the line with the smallest influence of crosstalk, without noise. A curve 162 shows the influence with noise. As can be seen, as in this simulated case for line 14 the influence of noise was greater than the influence of crosstalk, the crosstalk can hardly be distinguished in curve 162.

A curve 163 shows the influence of crosstalk without noise on line number 18, the line experiencing the greatest crosstalk from disturber line 10. Curve 164 shows the overall result for line number 18 including crosstalk and noise. In this case, the curve follows the curve without noise (curve 163) rather closely. In such situations, for example on line number 18 the disturber line may be identified correctly, while in line number 14 due to the comparatively high noise the detection may be incorrect.

Figure 17:
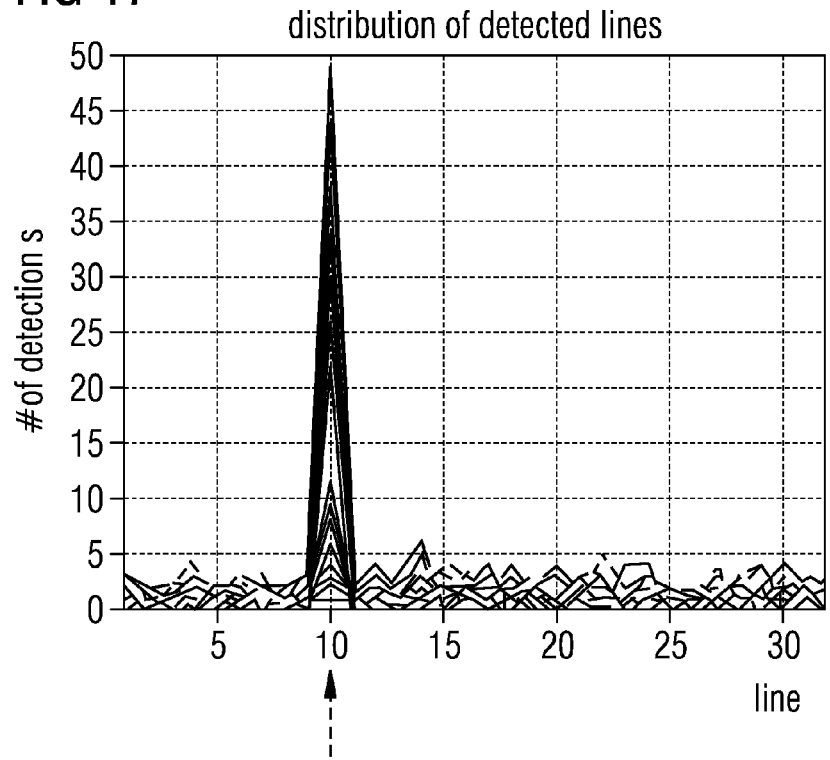

FIG. 17 shows simulated detection results. As can be seen, in this simulation most lines identified correctly line number 10 as disturber line. In particular, in the simulation example, of the 32 lines 24 lines correctly detect line number 10 as being the disturber line (i.e., based on a majority of error vectors line number 10 was identified), while 7 lines which are less influenced by the crosstalk exerted by the disturber line do not detect the disturber line correctly, but detect randomly distributed lines based on the respective error vectors. FIG. 17 shows the histogram for a plurality of detections for a plurality of symbols.

Figure 16:
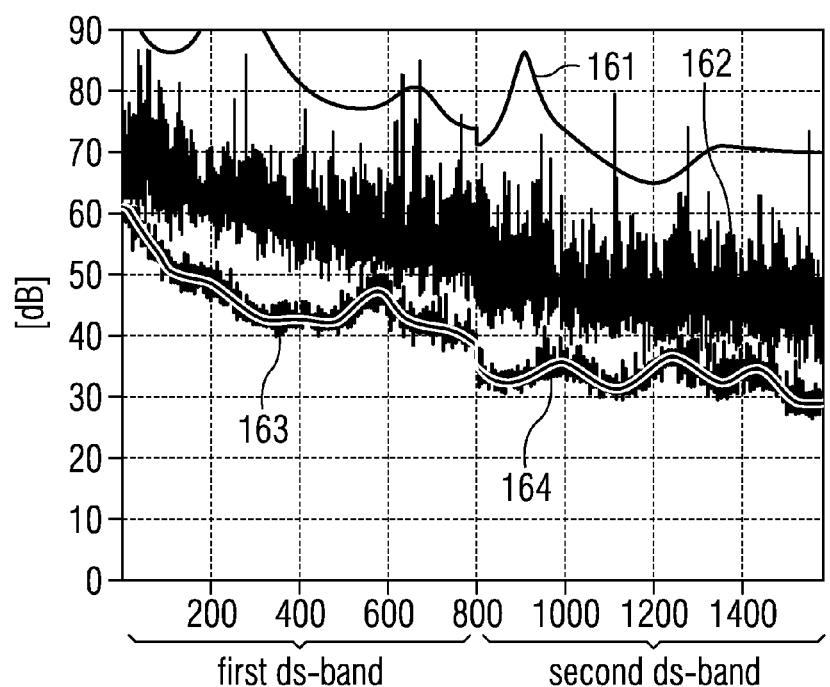
FIGS. 16 and 17 show simulation results for some implementations of embodiments.

It should be noted that the simulations of FIGS. 16 and 17 are merely intended to illustrate some features of some embodiments further and are not to be construed as limiting. In particular, the line numbers and parameters used in the simulation serve merely as examples and are not to be construed as limiting.

In the previously discussed embodiments of FIGS. 14 and 15, sequences with a length n are used to identify the different lines. As there are $2^n$ possibilities for combinations of +1 and −1 in this case, and only n different lines need to be identified, the method has a comparatively high robustness compared with embodiments where only the minimum length needed for identification of different lines (for example, for 32 lines 5 consecutive tones would be sufficient as $2^5$=32).

It should be noted that the above-described embodiments serve only as examples, and a plurality of modifications or variations are possible without departing from the scope of the present invention. For example, while in FIGS. 9 and 10 with increasing frequency a shift with regular intervals was used, in other embodiments the allocation of shift to the tones in a group may not be sequentially. For example, in an alternate embodiment in FIG. 9 tone 2 may be assigned a shift of 4 elements, tone 3 a shift of 2 elements and tone 4 a shift of 6 elements.

While in FIG. 13 shifting of sequences from tone to tone have been explained which enable both the adaptation described with reference to FIGS. 7-10 and the identification of a disturber line as explained with reference to FIGS. 14-17, in other embodiments shiftings or other characteristic sequence modifications assigned to the lines may be used only for determination of a disturber line. As already described in particular with reference to FIG. 8, also shiftings can be used only for adaptation of crosstalk coefficients.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An apparatus, comprising:
   a transmitter configured to transmit data via a plurality of communication channels of a communication connection to another communication device, said transmitter further configured to transmit a same sequence for vector training on each of said communication channels to the other communication device, and
   wherein the sequences for at least two of said communication channels are shifted with respect to each other.

2. The apparatus of claim 1, wherein said communication channels are grouped into a plurality of groups of communication channels, wherein sequences transmitted on communication channels within a group are shifted with respect to each other.

3. The apparatus of claim 2, wherein said sequences have a length of n elements, wherein each of said group comprises m communication channels, and wherein sequences for communication channels within a group are shifted by n/m elements with respect to each other.

4. The apparatus of claim 3, wherein n/m groups are grouped together in a main group, wherein sequences in different groups of a main group are collectively shifted with respect to sequences of other groups of the same main group.

5. The apparatus of claim 2, wherein sequences of at least one of the plurality of groups are collectively shifted with respect to sequences of another one of the plurality of groups.

6. The apparatus of claim 1, further comprising a receiver to receive a shift magnitude characterizing a number of sequence elements by which said shifting is effected.

7. The apparatus of claim 1, wherein said transmitter is configured to transmit DSL data via said communication connections, wherein said communication channels correspond to different tones, and wherein said sequences are sequences of pilot symbols.

8. The apparatus of claim 1, comprising:
   at least one further transmitter configured to transmit data via a plurality of further communication channels of at least one further communication connection, wherein said at least one further transmitter is configured to transmit a same sequence for vector training on each of the further communication channels of each of said at least one further communication connection, wherein, for each of said at least one further communication connections, the sequence for at least two further communication channels is shifted with respect to each other,
   wherein said communication connection and each of said at least one further communication connection is assigned a different sequence for vector training.

9. The apparatus of claim 8, wherein the sequences assigned to said communication connection and said at least one further communication connection are orthogonal to each other.

10. The apparatus of claim 1, wherein said sequence is transmitted to provide vector training for at least one of the group consisting of reducing crosstalk from a joining communication connection to communication connections of a vectored group, reducing crosstalk from communication connections in a vectored group to a joining communication connection, and reducing crosstalk between communication connections of a vectored group.

11. The apparatus of claim 1, wherein the shifting is performed such that sequences transmitted on different communication channels at a given time enable an identification of the communication connection.

12. A method, comprising:
   transmitting a different sequence of pilot signals over each of a plurality of communication connections, each communication connection linking two different communication devices and comprising a plurality of communication channels, by transmitting the respective sequence on each communication channel of a communication connection; and
   shifting the sequences for at least two communication channels of a communication connection with respect to each other.

13. The method of claim 12, comprising applying a same shift magnitude to corresponding communication channels on different communication connections.

14. The method of claim 12, wherein communication channels on each communication connection are grouped, and said transmitting comprises transmitting said sequences on communication channels within a group shifted with respect to each other.

15. The method of claim 14, wherein said sequences have a length of n elements, wherein each of said groups comprises m communication channels, and wherein sequences for communication channels within a group are shifted by n/m elements with respect to each other.

16. The method of claim 15, wherein n/m groups are grouped together in a main group, wherein sequences in different groups of a main group are collectively shifted with respect to sequences of other groups of the same main group.

17. The method of claim 14, comprising collectively shifting sequences of at least one of the plurality of groups with respect to sequences of another one of the plurality of groups.

18. The method of claim 12, further comprising:
   obtaining a plurality of error values for communication channels of said communication connections; and
   identifying a disturber line based on said error values.

19. The method of claim 18, comprising:
   determining a plurality of possible disturber connections based on a corresponding plurality of groups of error values of at least one of the communication connections; and
   identifying said disturber line based on a majority of said possible disturber connections.

* * * * *